(12) United States Patent
Ito

(10) Patent No.: US 9,064,201 B2
(45) Date of Patent: Jun. 23, 2015

(54) INFORMATION PROCESSING APPARATUS THAT INSTRUCTS PRINTING USING METADATA WITHOUT DIVULGING CONTENT OF THE METADATA AND METHOD THEREOF

(71) Applicant: CANON KABUSHIKI KAISHA, Tokyo (JP)

(72) Inventor: Yosuke Ito, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 53 days.

(21) Appl. No.: 13/855,057

(22) Filed: Apr. 2, 2013

(65) Prior Publication Data

US 2013/0271777 A1 Oct. 17, 2013

(30) Foreign Application Priority Data

Apr. 11, 2012 (JP) ................................ 2012-090452

(51) Int. Cl.
*G06K 15/02* (2006.01)
*G06F 3/12* (2006.01)
*G06F 21/60* (2013.01)

(52) U.S. Cl.
CPC .............. *G06K 15/18* (2013.01); *G06F 3/1222* (2013.01); *G06F 3/1243* (2013.01); *G06F 3/1246* (2013.01); *G06F 21/608* (2013.01)

(58) Field of Classification Search
None
See application file for complete search history.

(56) References Cited

U.S. PATENT DOCUMENTS

| 7,571,069 | B1 * | 8/2009 | Farkas et al. .................. 702/120 |
| 8,769,613 | B2 * | 7/2014 | Latchem et al. .................. 726/3 |
| 2009/0213406 | A1 * | 8/2009 | Kimura ........................ 358/1.13 |
| 2010/0238496 | A1 * | 9/2010 | Oshima ........................ 358/1.15 |
| 2011/0170140 | A1 * | 7/2011 | Naka et al. .................... 358/1.16 |

FOREIGN PATENT DOCUMENTS

| JP | 2006-294017 A | 10/2006 |
| JP | 2009-251803 A | 10/2009 |

* cited by examiner

*Primary Examiner* — Steven Kau
(74) *Attorney, Agent, or Firm* — Rossi, Kimms & McDowell LLP

(57) ABSTRACT

A document for variable printing and print settings including a conditional print setting that depends on metadata included in the document are received, information that is common between the conditional print setting and metadata included in the document is replaced with unique information, and printing is instructed using the conditional print setting and the document in which the common information is replaced with the unique information.

15 Claims, 22 Drawing Sheets

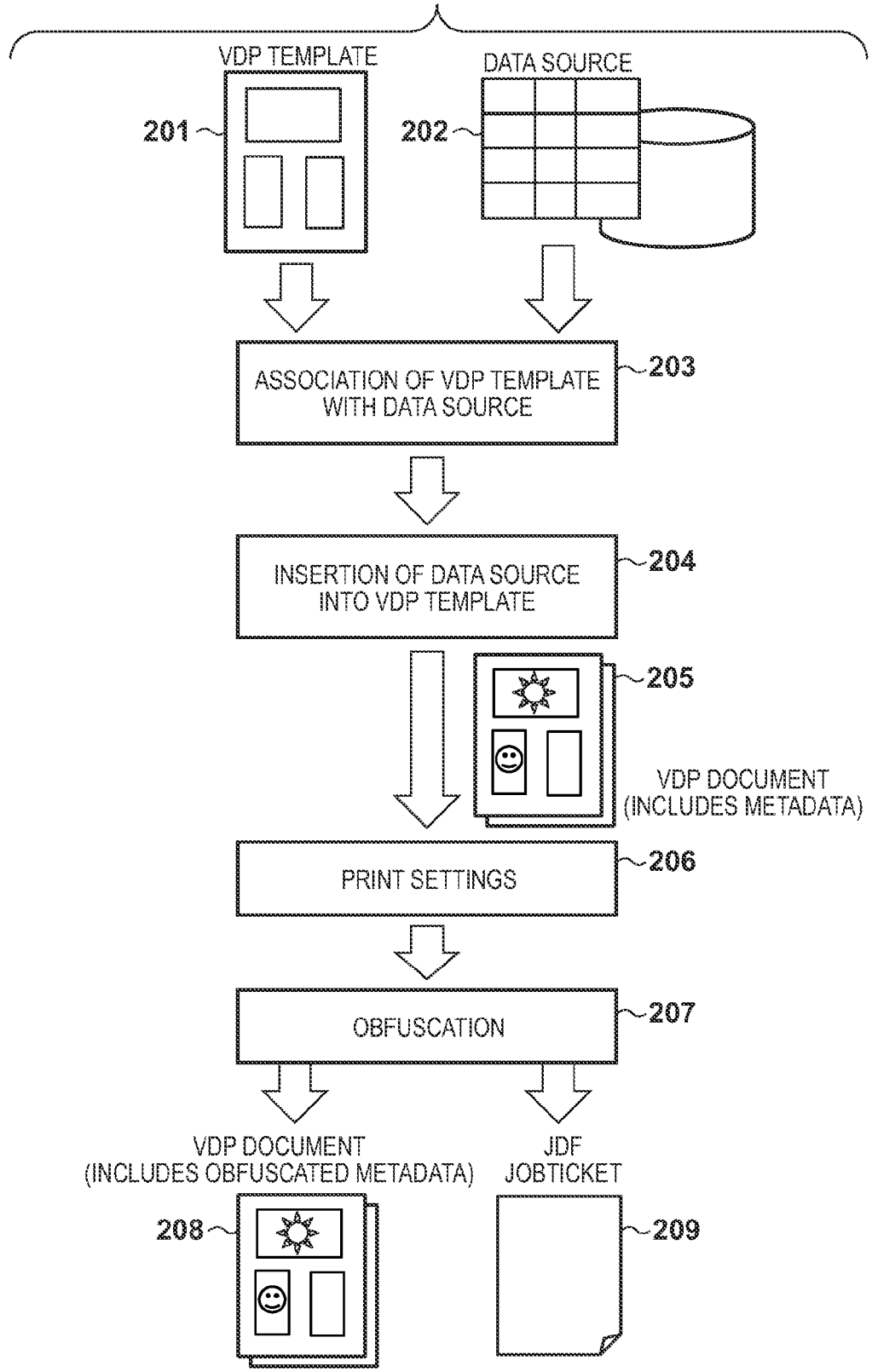

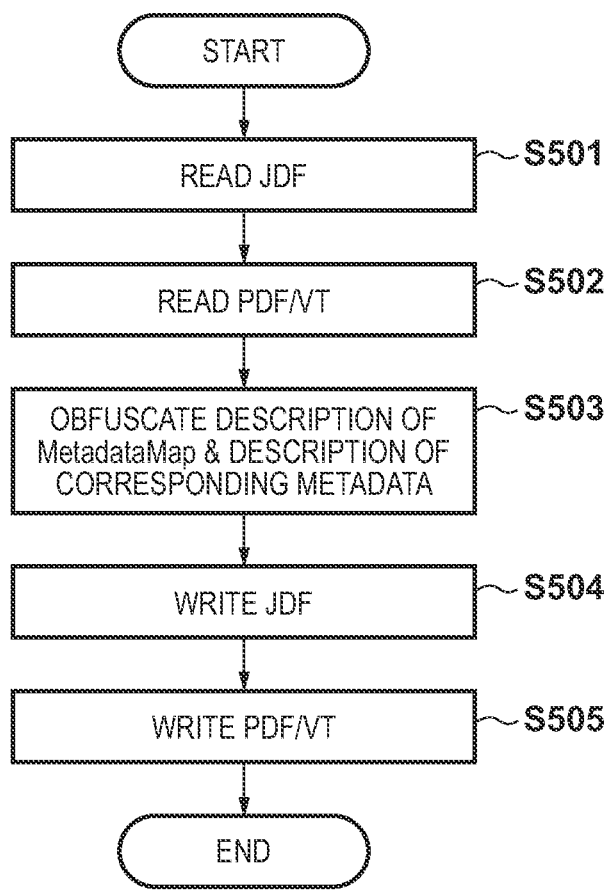

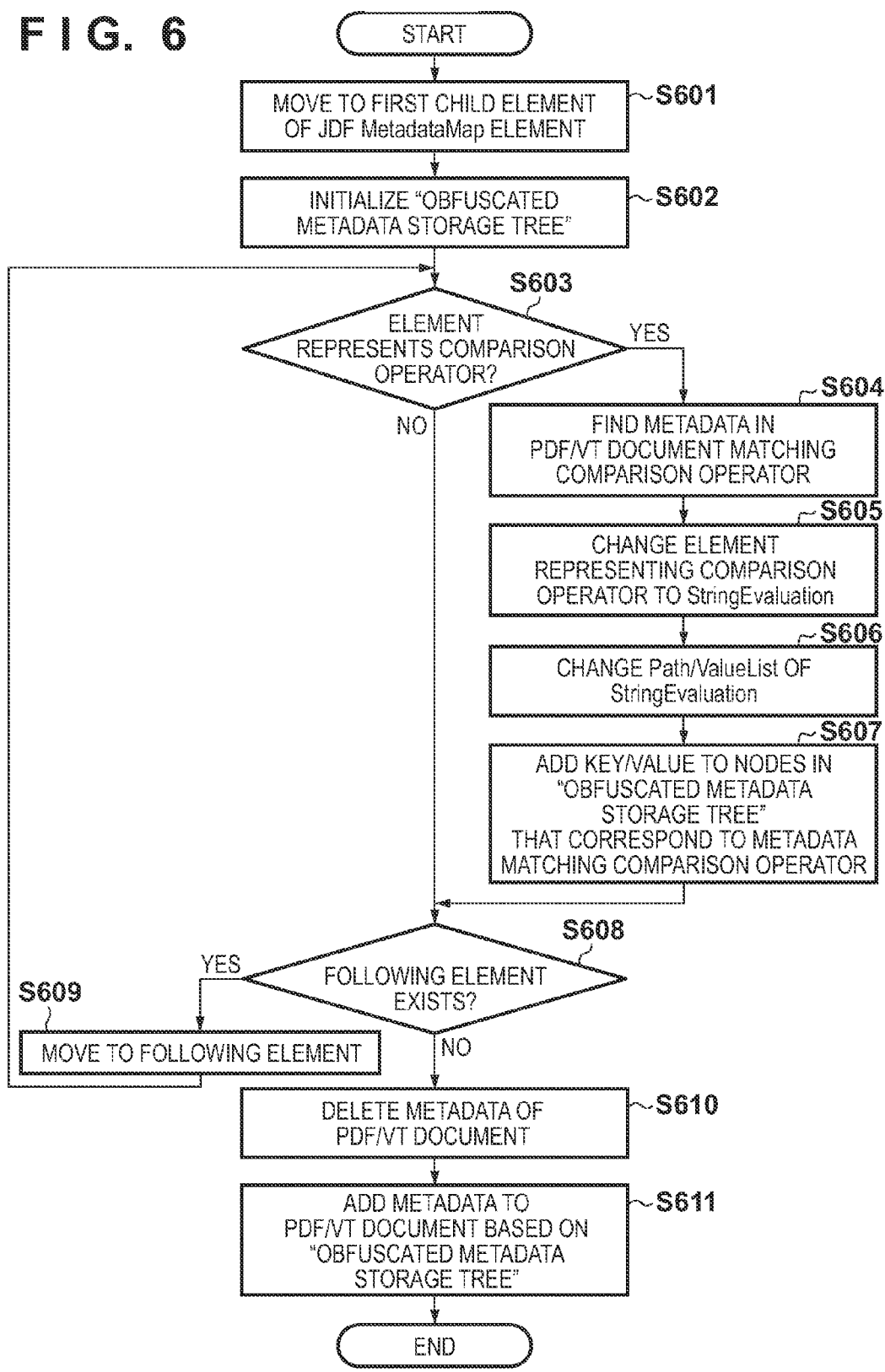

FIG. 8A

JDF  801

```
<MetadataMap DataType="PartIDKey" Name="RunTags"
ValueFormat="%s" ValueTemplate="valtem">
    <!- if Gender=Female then substitute "Pattern1" for valtem-->
    <Expr Name="valtem" Value="Pattern1">                              803
        <NameEvaluation Path="/DPart/DPM/KEY[@name='Gender']" ValueList="Female"/>
    </Expr>
    <!- if Gender=Male then substitute "Pattern2" for valtem-->
    <Expr Name="valtem" Value="Pattern2">
        <NameEvaluation Path="/DPart/DPM/@Gender" ValueList="Male"/>
    </Expr>
</MetadataMap>
<Paper PartIDKey="RunTags">
    <Paper Separation="Pattern1">GlossPaper</Paper>
    <Paper Separation="Pattern2">MattePaper</Paper>
</Paper>
```

FIG. 8B

PDF/VT  802

```
<DPartRoot>
    <DPart>
        <DPM>
            <KEY name=Gender>Male</KEY>          804
            <KEY name=Age>21</KEY>
            <KEY name=Name>Tanaka</KEY>
        </DPM>
        <Page></Page>
    </DPart>
    <DPart>
        <DPM>
            <KEY name=Gender>Female</KEY>        805
            <KEY name=Age>52</KEY>
            <KEY name=Name>Sato</KEY>
        </DPM>
        <Page></Page>
    </DPart>
    <DPart>
        <DPM>
            <KEY name=Gender>Female</KEY>        806
            <KEY name=Age>73</KEY>
            <KEY name=Name>Suzuki</KEY>
        </DPM>
        <Page></Page>
    </DPart>
</DPartRoot>
```

FIG. 9

```
JDF                                                                    ~801
<MetadataMap DataType="PartIDKey" Name="RunTags"
ValueFormat="%s" ValueTemplate="valtem">
     <!- if Gender=Female then substitute "Pattern1" for valtem-->
     <Expr Name="valtem" Value="Pattern1">                         901
          <StringEvaluation Path="/DPart/DPM/KEY[@name='03f39']" ValueList="f8098j"/>
     </Expr>
     <!- if Gender=Male then substitute "Pattern2" for valtem-->
     <Expr Name="valtem" Value="Pattern2">
          <NameEvaluation Path="/DPart/DPM/KEY[@name='Gender']" ValueList="Male"/>
     </Expr>
</MetadataMap>
<Paper PartIDKey="RunTags">
     <Paper Separation="Pattern1">GlossPaper</Paper>
     <Paper Separation="Pattern2">MattePaper</Paper>
</Paper>
```

FIG. 10

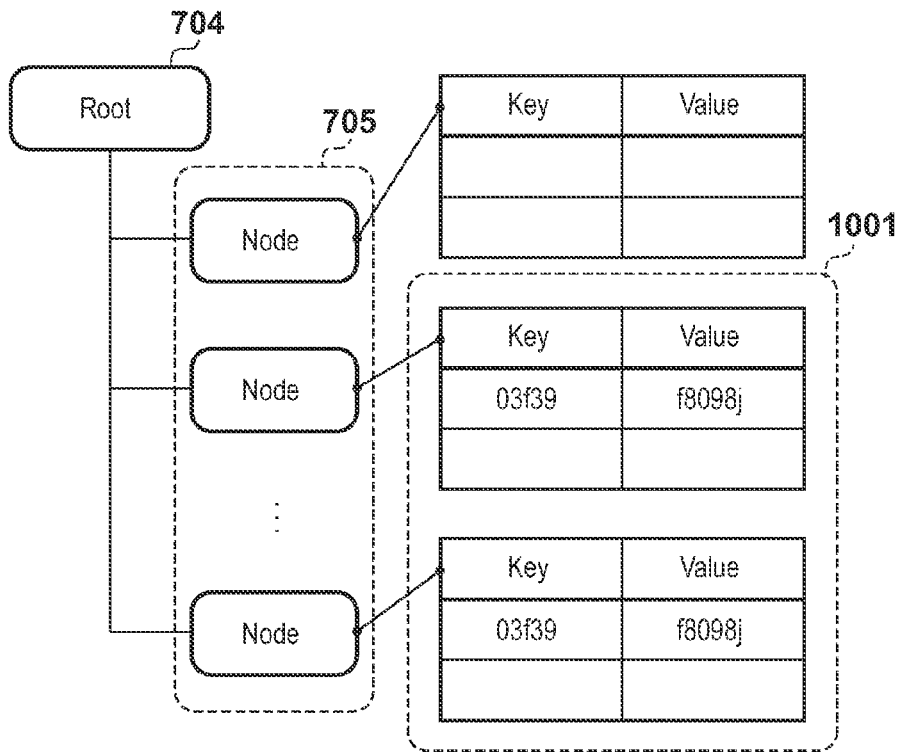

FIG. 11

```
JDF                                                                              801
<MetadataMap DataType="PartIDKey" Name="RunTags"
ValueFormat="%s" ValueTemplate="valtem">
      <!- if Gender=Female then substitute "Pattern1" for valtem-->
      <Expr Name="valtem" Value="Pattern1">
            <StringEvaluation Path="/DPart/DPM/KEY[@name='03f39']" ValueList="f8098j"/>
      </Expr>
      <!- if Gender=Male then substitute "Pattern2" for valtem-->        1101
      <Expr Name="valtem" Value="Pattern2">
            <NameEvaluation Path="/DPart/DPM/KEY[@name='Gender']" ValueList="Male"/>
      </Expr>
</MetadataMap>
<Paper PartIDKey="RunTags">
      <Paper Separation="Pattern1">GlossPaper</Paper>
      <Paper Separation="Pattern2">MattePaper</Paper>
</Paper>
```

FIG. 12

```
JDF                                                                              801
<MetadataMap DataType="PartIDKey" Name="RunTags"
ValueFormat="%s" ValueTemplate="valtem" >
      <!- if Gender=Female then substitute "Pattern1" for valtem-->
      <Expr Name="valtem" Value="Pattern1">
            <StringEvaluation Path="/DPart/DPM/KEY[@name='03f39']" ValueList="f8098j"/>
      </Expr>
      <!- if Gender=Male then substitute "Pattern2" for valtem-->        1201
      <Expr Name="valtem" Value="Pattern2">
            <StringEvaluation Path="/DPart/DPM/KEY[@name='21aj90']" ValueList="fea9j09"/>
      </Expr>
</MetadataMap>
<Paper PartIDKey="RunTags">
      <Paper Separation="Pattern1">GlossPaper</Paper>
      <Paper Separation="Pattern2">MattePaper</Paper>
</Paper>
```

F I G. 14

```
PDF/VT                                                      802
<DPartRoot>
    <DPart>
        <DPM>
            <KEY name=Gender>Male</KEY>      1401
            <KEY name=Age>21</KEY>
            <KEY name=Name>Tanaka</KEY>
        </DPM>
        <Page></Page>
    </DPart>
    <DPart>
        <DPM>
            <KEY name=Gender>Female</KEY>    1402
            <KEY name=Age>52</KEY>
            <KEY name=Name>Sato</KEY>
        </DPM>
        <Page></Page>
    </DPart>
    <DPart>
        <DPM>
            <KEY name=Gender>Female</KEY>    1403
            <KEY name=Age>73</KEY>
            <KEY name=Name>Suzuki</KEY>
        </DPM>
        <Page></Page>
    </DPart>
</DPartRoot>
```

F I G. 15

```
PDF/VT                                                          802
<DPartRoot>
    <DPart>
        <DPM>
            <KEY name=21ajf90>fea9j09<KEY>      1501
        </DPM>
        <Page></Page>
    </DPart>
    <DPart>
        <DPM>
            <KEY name=03f39>f8098j<KEY>         1502
        </DPM>
        <Page></Page>
    </DPart>
    <DPart>
        <DPM>
            <KEY name=03f39>f8098j<KEY>         1503
        </DPM>
        <Page></Page>
    </DPart>
</DPartRoot>
```

F I G. 16B
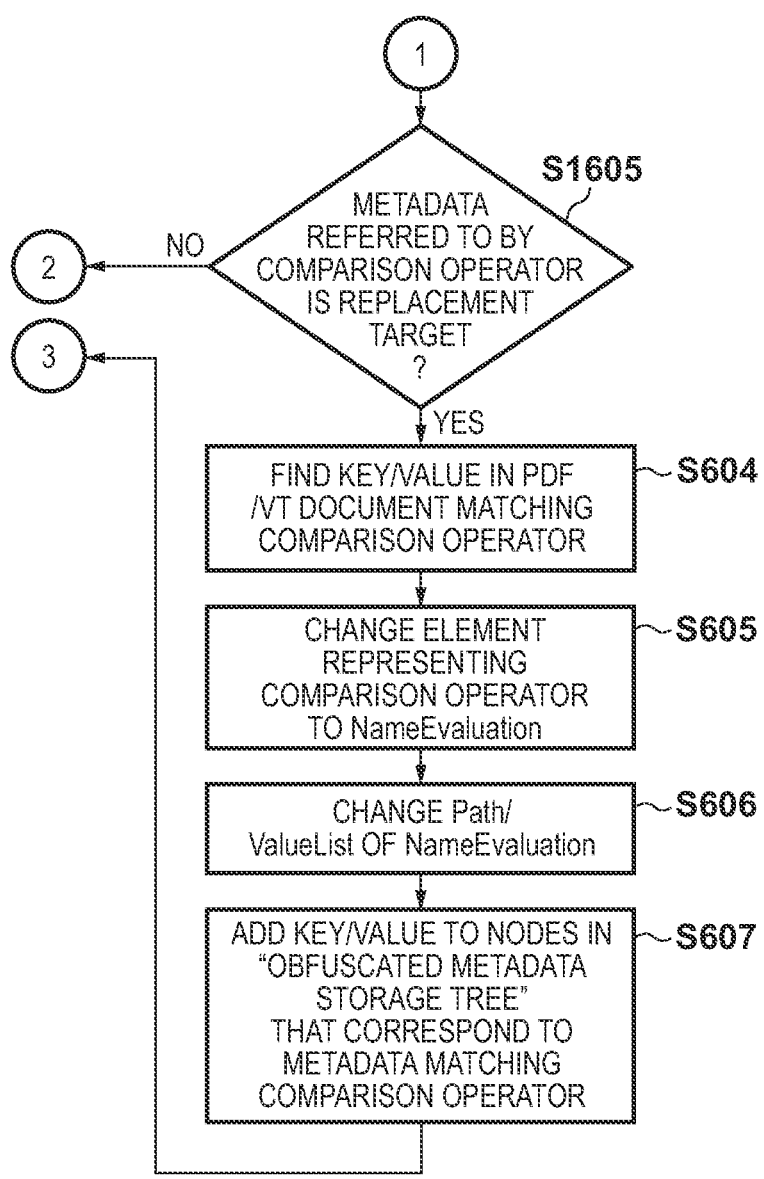

F I G. 17
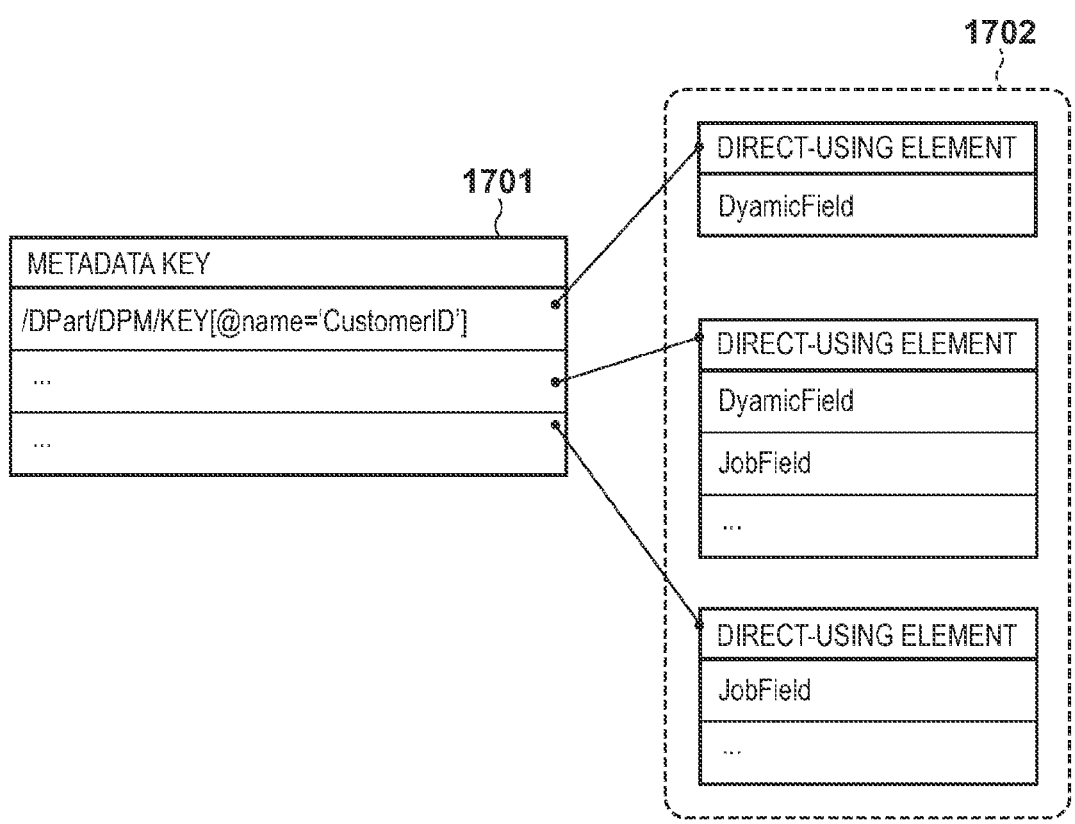

F I G. 19

REPLACEMENT TARGET METADATA SELECTION — 1901, 1902

| | | |
|---|---|---|
| INPUT VDP DOCUMENT | C:\work\job1\brochure.pdfvt | ... |
| INPUT JDF JobTicket | C:\work\job1\brochure_jt.jdf | ... |

| | | |
|---|---|---|
| OUTPUT FOLDER | C:\work\job1\converted | ... |

REPLACEMENT TARGET METADATA — 1908 SELECT ALL — 1909 UNSELECT ALL

1903

| KEY | EXEMPLARY VALUES | DIRECT REFERENCE | REPLACEMENT TARGET |
|---|---|---|---|
| Name | Tanaka, Sato, ... | NO | ✓ |
| Age | 41, 22, ... | NO | ✓ |
| Gender | Male, Female | NO | ✓ |
| CustomerID | 3170310, ... | YES(DynamicField...) | ☐ |
| Address1 | Tokyo, Osaka, ... | NO | ✓ |
| Address2 | Ohta-ku, ... | NO | ✓ |

1904  1905  1906

REPLACE — 1910     CANCEL — 1911

JDF  2101

```
<MetadataMap DataType="String" Name="CustomerID"  ~2107
ValueFormat="%s" ValueTemplate="valtem">
    <!- directly refer to and substitute CustomerID for valtem -->
    <Expr Name="valtem" Path="/DPart/DPM/KEY[@name='CustomerID']"/>   2103
</MetadataMap>

(...omitted...)

<Layout Class="Parameter" ID="Link0003" Status="Available">
    <ContentObject CTM="1 0 0 1 0 0" Ord="0"/>
    <MarkObject CTM="1 0 0 1 10 10">
        <LayoutElement ElementType="Graphic">
            <FileSpec URL="File:///MyMark.pdf"/>
        </LayoutElement>                                              2108
        <DynamicField Format="%s" Ord="0" ReplaceField="___xxx___"
            Template="CustomerID"/>
    </MarkObject>
</Layout>
```

FIG. 21B

PDF/VT  2102

```
<DPartRoot>
    <DPart>
        <DPM>
            <KEY name=CustomerID>12A98983</KEY>     ~2104
            <KEY name=Name>Tanaka</KEY>
        </DPM>
        <Page></Page>
    </DPart>
    <DPart>
        <DPM>
            <KEY name=CustomerID>UUI9991Y</KEY>     ~2105
            <KEY name=Name>Sato</KEY>
        </DPM>
        <Page></Page>
    </DPart>
    <DPart>
        <DPM>
            <KEY name=CustomerID>N8696923</KEY>     ~2106
            <KEY name=Name>Suzuki</KEY>
        </DPM>
        <Page></Page>
    </DPart>
</DPartRoot>
```

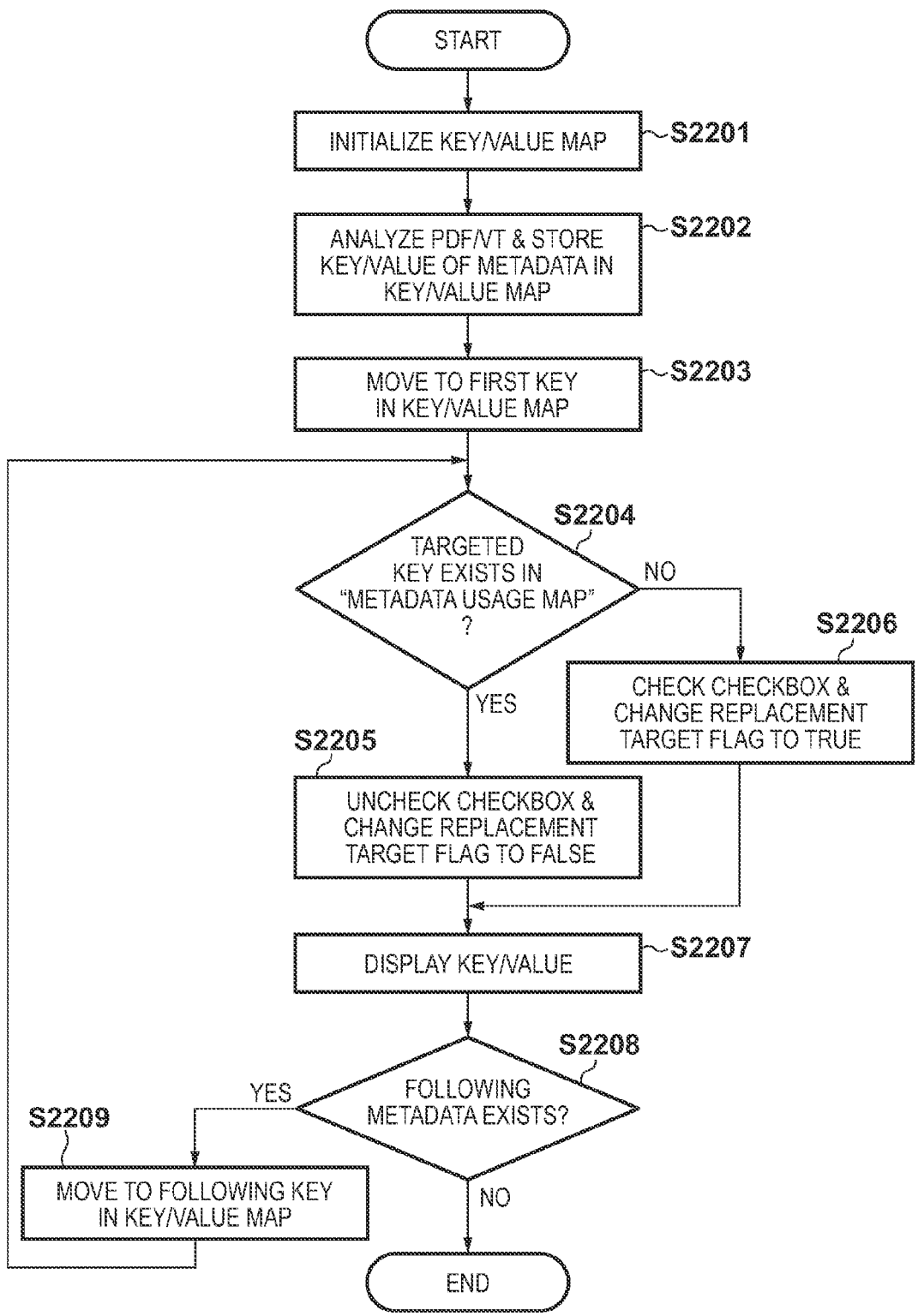

INFORMATION PROCESSING APPARATUS THAT INSTRUCTS PRINTING USING METADATA WITHOUT DIVULGING CONTENT OF THE METADATA AND METHOD THEREOF

BACKGROUND OF THE INVENTION

1. Field of the Invention

The present invention relates to technology for processing document data including meta-information, and printing control data having reference information to the meta-information and conditional print settings that depend on the contents of the meta-information.

2. Description of the Related Art

A printing method known as variable data printing (VDP) is in use. With VDP, data is divided into fixed portions and variable portions, and the data of the variable portions is supplied from a data source such as a relational database (RDB) or a comma-separated values (CSV) file. Here, different contents are printed per record, by associating digits (or fields) of the data source with variable portions of a template document, and applying the digits per line (or record) of the data source.

With VDP, it is possible to create direct mail or the like in which product information provided is changed in accordance with customer information, for example. Also, a collection of logical information such as page layout, data source and the like required in VDP is called a VDP document. In recent years, there have emerged formats in which information on recipients (e.g.: IDs for identifying recipients, gender, addresses, etc.) is embedded in VDP documents as metadata.

Generally, job definition format (JDF) is used as the method for controlling the print settings for when printing a VDP document. The JDF specification includes a JDF Job-Ticket as a data format for conveying the printing control method to a device. In recent years, a method has been used in which printing is performed after configuring print settings variably for every recipient of printed matter, using metadata embedded in a VDP document and a JDF JobTicket that refers to the metadata. For example, in the case where metadata that uses an attribute of the recipient such as "gender", for example, as a key is included in the VDP document, it is possible to configure conditional settings in the JDF Job-Ticket, such that matte paper is set if the value of the "gender" key is "male", and gloss paper is set if the value of the "gender" key is "female".

Thus, while diverse print settings can be configured by embedding metadata in a VDP document, there is also a risk of personal information included in the VDP document being disclosed should the metadata be viewed by a third party. For example, in the case where the printing process is outsourced, it is conceivable that the VDP document will be leaked from the outsourcee to a third party, and that embedded metadata (e.g., personal information of the recipient of printed matter) will be viewed.

As technology for preventing such disclosure of the contents of a print job, technology for encrypting the entire print job has heretofore been disclosed. Japanese Patent Laid-Open No. 2006-294017 proposes a technique in which the document to be printed is encrypted by the host of the printer and converted to printer-independent intermediate data, and the intermediate data is decrypted and printed by the printer.

There is also literature that discloses technology for performing obfuscation processing on specific confidential character strings in the case where the document text contains confidential information, and decrypting the confidential character strings in the printer. For example, Japanese Patent Laid-Open No. 2009-251803 proposes a technique for obfuscating confidential information included in an XML paper specification (XPS) document. In Japanese Patent Laid-Open No. 2009-251803, designation of a character string as confidential information is received from a user, the character string is replaced with globally unique identifier (GUID), and the GUID and the original character string are written as a pair into XPS metadata. In the case where the XPS document is read by an XPS viewer, the confidential information is displayed in the state of having been replaced with the GUID, since the metadata portion is skipped. The obfuscated XPS document is then restored in the printer.

If encryption is performed as described in Japanese Patent Laid-Open No. 2006-294017, it will be possible to prevent disclosure of information, at least while the information is encrypted. However, in order to implement variable print settings on an encrypted document, the metadata needs to be decrypted at some stage during the printing process. There is a chance that personal information will be viewed at some point after decryption, such as when a decrypted job is placed in a spool folder, for example.

Also, a special apparatus for performing decryption has to be provided. For example, if decryption is performed in the printer, a special function for performing decryption has to be added to the printer. Furthermore, there is a disadvantage in that the processing is time-consuming depending on the decryption processing, and printing performance decreases. Also, in the case of encrypting a document, there is a risk of the code being deciphered depending on the encryption algorithm.

Also, in the case of Japanese Patent Laid-Open No. 2009-251803, since confidential information is written in plain text in the metadata portion included in the document, there is a possibility of confidential information being disclosed when the contents of the document are analyzed.

SUMMARY OF THE INVENTION

The present invention provides an information processing apparatus and method for instructing printing according to variable print settings that depend on metadata included in a VDP document, without the contents of the metadata being divulged to a third party.

An information processing apparatus according to the embodiment of the present invention includes a receiving unit that receives a document for variable printing and print settings including a conditional print setting that depends on metadata included in the document, a replacing unit that replaces, in the document received by the receiving unit, information that is common between the conditional print setting and metadata included in the document with unique information, and an instructing unit that instructs printing, using the conditional print setting and the document in which the common information is replaced with the unique information.

The above configuration enables printing according to variable print settings that depend on metadata included in a VDP document to be instructed, without the contents of the metadata being divulged to a third party.

Further features of the present invention will become apparent from the following description of exemplary embodiments (with reference to the attached drawings).

BRIEF DESCRIPTION OF THE DRAWINGS

FIG. 2 is a diagram for illustrating a workflow of the present embodiment.

FIG. 5 is a flowchart showing processing for obfuscating a PDF/VT document and a JDF JobTicket.

FIG. 6 is a flowchart showing the details of obfuscation processing.

FIG. 8A is a diagram showing an example of a JDF JobTicket.

FIG. 8B is a diagram showing an example of a PDF/VT document.

FIG. 9 is a diagram showing a JDF JobTicket after changing the value of a Path attribute and the value of a ValueList attribute with regard to a comparison operator.

FIG. 10 is a diagram showing a state in which keys and values after obfuscation are stored.

FIG. 11 is a diagram showing an example of a JDF JobTicket after completion of processing in relation to a first comparison operator.

FIG. 12 is a diagram showing an example of a JDF JobTicket in which the comparison operator was changed at S605.

FIG. 14 is a diagram showing an example of metadata for deletion at S610.

FIG. 15 is a diagram showing an example of a PDF/VT document to which metadata after obfuscation was added at S611.

FIGS. 16A and 16B are flowcharts showing the details of a variation in obfuscation processing.

FIG. 17 is a diagram showing the data structure of a map of metadata and elements within a JDF JobTicket that refer directly to the metadata.

FIG. 19 is a diagram showing an UI for designating metadata to be replaced.

FIG. 21A is a diagram showing a JDF JobTicket of a variation.

FIG. 21B is a diagram showing an example of the script of a PDF/VT document of the variation.

FIG. 22 is a flowchart showing the detailed processing of UI display processing (S1603).

DESCRIPTION OF THE EMBODIMENTS

Hereinafter, embodiments for carrying out invention will be described in detail, with reference to the drawings.

Configuration of Printing System

Figure 1:
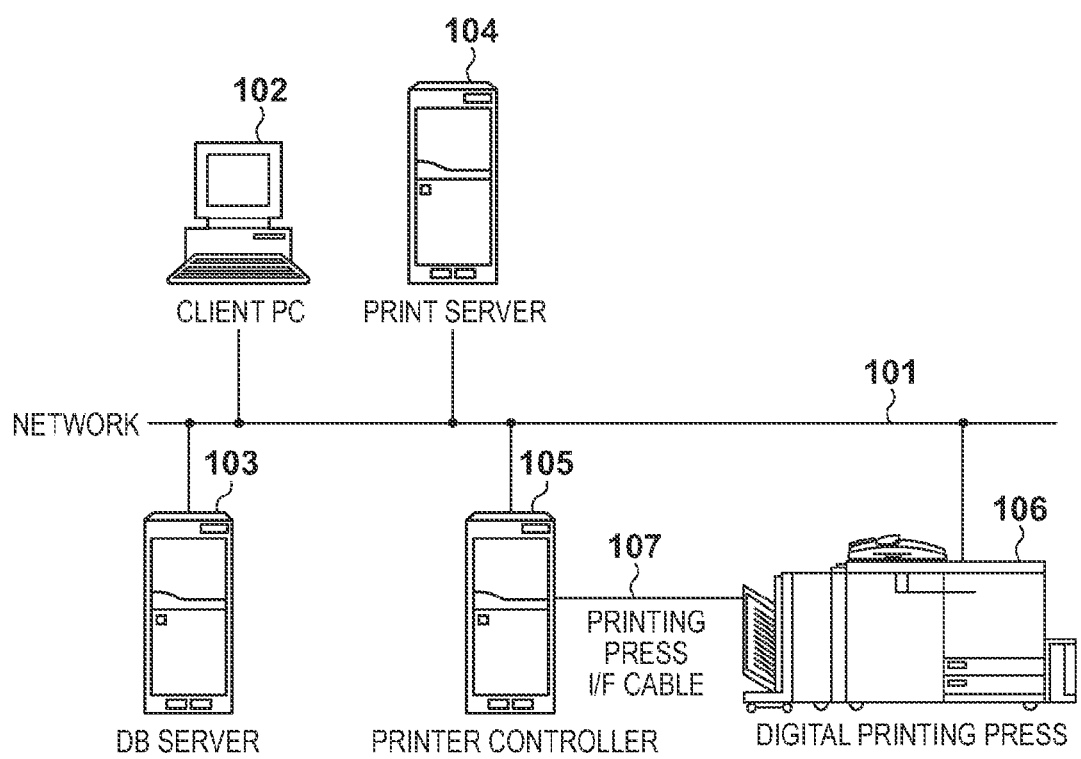
FIG. 1 is a schematic diagram showing an example of the configuration of a printing system of the present embodiment.

FIG. 1 is a schematic diagram showing an example of the configuration of a printing system in the present embodiment. This printing system has a client PC 102, a database (DB) server 103, a print server 104, a printer controller 105, and a digital printing press 106 that are connected via a network 101. Also, the printer controller 105 and the digital printing press 106 are connected by a printing press interface (I/F) cable 107.

The client PC 102 generates a VDP document by accessing the DB server 103 and inserting data stored in the DB server 103 into a VDP template. The client PC 102 then transmits the VDP document to the print server 104.

The print server 104 receives the VDP document from the client PC 102 and receives print settings for the VDP document from a user of the client PC 102. Specifically, the user configures print settings for the entire job relating to the VDP document, and conditional print settings that depend on metadata included in the VDP document. When the print settings have been configured, the print settings are generated as a job ticket.

Furthermore, the print server 104 obfuscates the above-mentioned VDP document and job ticket, by a technique according to the present embodiment. Thereafter, the print server 104 transmits the obfuscated VDP document and job ticket to the printer controller 105.

On the other hand, the printer controller 105 receives the obfuscated VDP document and job ticket from the print server 104, interprets the job ticket, and gives a print instruction to the digital printing press 106. Also, the printer controller 105 performs raster image processing (RIP), and transmits the bitmap resulting from the RIP to the digital printing press 106 via the printing press interface cable 107.

Here, an example is given in which respective apparatuses are connected by the network 101, but the connection configuration is not limited thereto, and a configuration may be adopted in which data is passed between apparatuses using a USB memory or the like, for example.

Workflow

Here, the workflow in the present embodiment will be described using FIG. 2. First, the user performs the task of associating a VDP template 201 and a data source 202, using the client PC 102 (203). Note that the VDP template 201 is data having a container for funneling graphics, images and text common to each recipient and personal information of the recipient into. Also, the data source 202 is data stored in the DB server 103, and contains the personal information of the recipients of printed matter.

Thereafter, when the user instructs generation of a VDP document, the client PC 102 inserts the data of the data source 202 into the container of the VDP template 201, and generates a VDP document 205 (204). Formats of the VDP document 205 include PDF/VT (ISO 16612-2:2010) and personalized print markup language (PPML), with PDF/VT being given as example in the following description. Note that this VDP document 205 is not limited to PDF/VT, and may be another VDP document format.

The personal information of the recipient included in the data source 202 is embedded in the VDP document 205 at the same time at which this VDP document 205 is generated. For example, information such as the age, gender and address of a recipient A is embedded in a portion for the recipient A in the VDP document 205.

PDF/VT has a page object structuring function called a document part (DPart) hierarchical structure and a metadata setting function called document part metadata (DPM). Arbitrary groupings of a "key" and a "value" can be set in this DPM, and meaning can be attached to the DPart by the DPM.

The user is thereby able to configure print settings with respect to the DPart, subject to the metadata set in DPM rather than individual pages. For example, recipient A's personal information is embedded as DPM in the DPart corresponding to the document that will be received by recipient A.

Next, the user configures the print settings using the print server 104 (206). Specifically, the user configures a conditional print setting based on the print settings relating to the entire job and metadata embedded in the VDP document 205. For example, if the key is "Gender" and the value is "Male", a setting is configured to use gloss paper.

A JDF JobTicket is generated as a result of configuring these settings. Here, JDF stands for job definition format. This JDF JobTicket contains print settings relating to the entire job and a conditional print setting that indicates to use gloss paper if the key is gender and the value is male as just set by the user.

Next, the print server 104 performs obfuscation processing on the VDP document 205 and the JDF ticket (207). The method of this obfuscation will be discussed later using FIGS. 4A and 4B. As a result, a VDP document 208 and a JDF JobTicket 209 that have undergone obfuscation are generated.

An example has been described above in which processing up to insertion of individual data into a template (204) is performed on the client PC 102, and processing from the configuration of print settings (206) onward is performed on the print server 104. However, the present invention is not limited thereto, and all of the processing may be performed on the client PC 102. In this case, the print server 104 only relays the VDP document and the job ticket. Also, a configuration may be adopted in which processing up to the configuration of print settings (206) is performed on the client PC 102, and only the obfuscation processing (207) is performed on the print server 104.

Configuration of Client PC

Figure 3A:
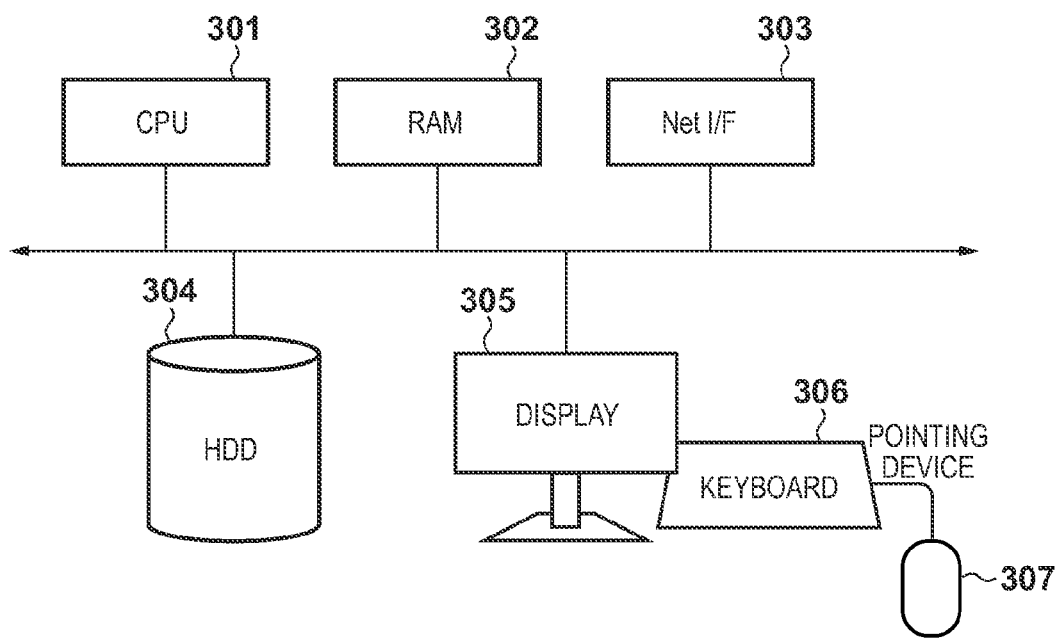
FIGS. 3A and 3B are respectively a diagram showing an example of the hardware configuration of a client PC, and a diagram showing an example of the hardware configuration of a printer controller.

Next, an example of the hardware configuration of the client PC 102 in the present embodiment will be described using FIG. 3A. Note that the client PC 102 is an information processing apparatus such as a personal computer. Generally known hardware configurations of the client PC 102 have various connection methods and various buses and interfaces, and the hardware configuration introduced here is intended as an example.

A CPU 301 is a control unit that performs overall control of the apparatus in accordance with control programs read into a RAM 302. The RAM 302 is an internal memory unit into which control programs of the apparatus that are executed by the CPU 301 and data such documents and images are read. A network interface (Net I/F) 303 is a network interface that connects with a network such as the Internet under the control of the CPU 301, and transmits and receives data and the like. An HDD 304 is a hard disk drive (HDD) that saves various data including control software of the client PC 102. A display 305 displays the state of the apparatus, instructions to the apparatus, and the like. A keyboard 306 and a pointing device 307 such as a mouse are for inputting instructions to the apparatus.

Note that various types of software stored in the HDD 304 are read into the RAM 302 when required, and executed under the control of the CPU 301, using functions of the operating system similarly read into the RAM 302 when required.

Configuration of DB Server and Print Server

The hardware configurations of the DB server 103 and the print server 104 in the present embodiment are similar to the hardware configuration of the abovementioned client PC 102, and description here is omitted. Note that the DB server 103 and the print server 104 are also information processing apparatuses such as general-purpose server computers.

Configuration of Printer Controller

Figure 3B:
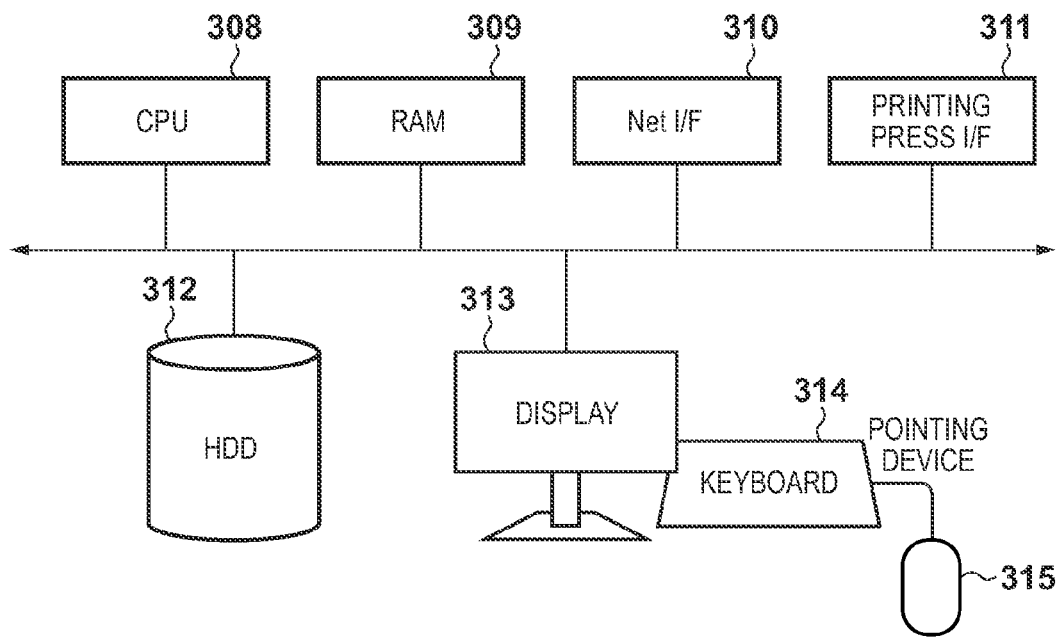

Next, an example of the hardware configuration of the printer controller 105 in the present embodiment will be described using FIG. 3B. Generally known hardware configurations of the printer controller 105 have various connection methods and various buses and interfaces, similarly to the client PC 102, and the hardware configuration introduced here is intended as an example.

A CPU 308 is a control unit that performs overall control of the apparatus in accordance with control programs read into a RAM 309. The RAM 309 is an internal memory unit into which control programs of the apparatus that are executed by the CPU 308 and data such as documents and images are read. A network interface (Net I/F) 310 is a network interface that connects with a network such as the Internet under the control of the CPU 308, and transmits and receives data and the like. An HDD 312 is a hard disk drive (HDD) that saves various data including control software of the printer controller 105. A display 313 is for displaying the state of the apparatus, instructions to the apparatus, and the like. A keyboard 314 and a pointing device 315 such as a mouse are for inputting instructions to the apparatus. A printing press interface 311 is connected to the digital printing press 106 by the printing press interface cable 107, and is used in transmission of data that has undergone RIP processing.

Note that various types of software stored in the HDD 312 are read into the RAM 309 when required, and executed under control of the CPU 308, using functions of the operating system similarly read into the RAM 309 when required.

Overview of Obfuscation Processing

Here, an overview of the obfuscation processing in the present embodiment will be described using FIGS. 4A and 4B. Note that the actual processing (obfuscation program) will be discussed later using the flowcharts shown in FIGS. 5 and 6.

Figure 4A:
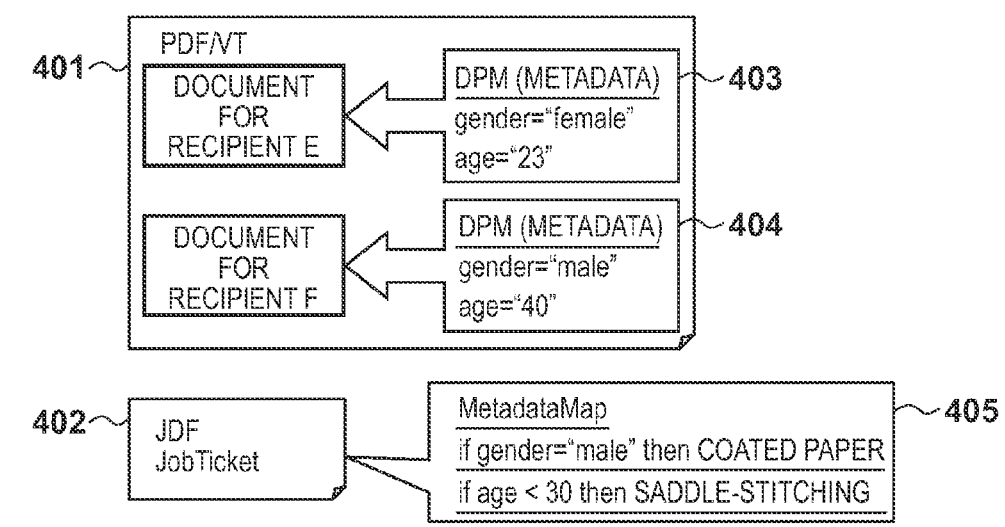
FIG. 4A is a diagram showing a PDF/VT document and a JDF JobTicket before obfuscation.

FIG. 4A is a diagram conceptually showing a PDF/VT document and a JDF JobTicket before obfuscation. In a PDF/VT document 401, the value "female" is set for the key "gender" as metadata 403 of a document for a recipient E. Furthermore, a value "23" is set for the key "age". On the other hand, the value "male" is set for the key "gender" as the metadata 404 of the document for a recipient F. Furthermore, the value "40" is set for the key "age".

In contrast, conditional print settings 405 that are conditional on metadata are configured in a JDF JobTicket 402. In this example, settings are configured such that gloss paper is used if the value of the key "gender" is "male", and saddle-stitching is applied if the value of the key "age" is less than 30.

Note that with JDF, a mapping relation between metadata that is referred to and a variable used in JDF is described in an element "MetadataMap". Also, with JDF, print settings that depend on that variable can be configured, and variable print settings that depend on metadata are realized using this function.

In the case where the printer controller 105 interprets the abovementioned JDF JobTicket 402, printing is performed using gloss paper on the document for the recipient F corresponding to the condition of the key "gender" of the conditional print setting 405. Also, saddle-stitching is performed on the document for the recipient E corresponding to the condition of the key "age".

However, the PDF/VT document 401 of FIG. 4A contains personal information (age, gender) of the recipients, and if the conditions included in the JDF JobTicket 402 were to be divulged, there is a risk of the personal information of the recipients being viewed by a third party since personal information can be specified from printed matter, for example.

Figure 4B:
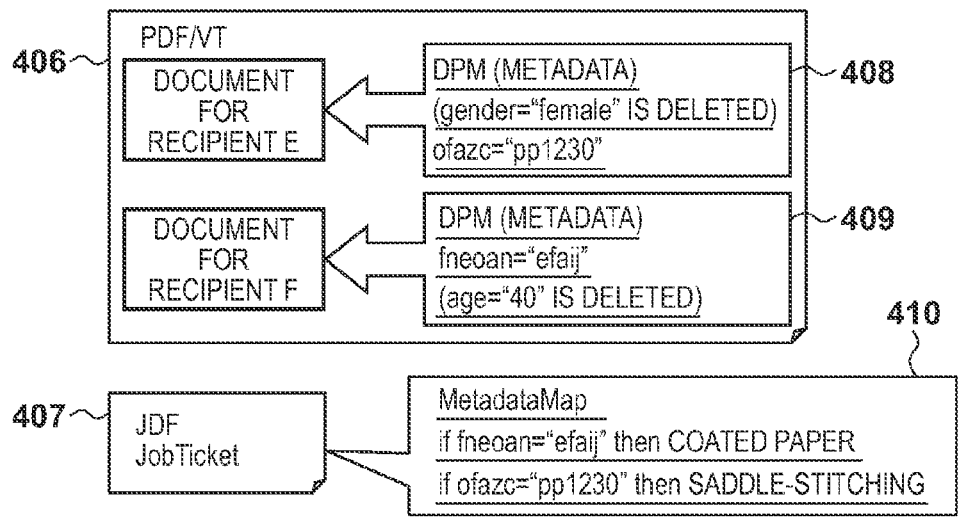
FIG. 4B is a diagram showing a PDF/VT document and a JDF JobTicket after obfuscation.

In view of this, a PDF/VT document and a JDF JobTicket after obfuscation so as to prevent the personal information of the recipients from being viewed by a third party are shown in FIG. 4B.

In the obfuscation processing of the present embodiment, the keys and values of metadata included in the PDF/VT document are replaced with other predetermined character strings that prevent the original keys and values from being guessed. Keys and values are also replaced with other predetermined character strings in relation to the condition portion (MetadataMap) of the conditional print settings of the JDF JobTicket. At this time, the conditional expressions are replaced with predetermined character strings, so as to maintain the reference relation between the MetadataMap and metadata. Specifically, the conditional expressions are replaced with predetermined character strings, as shown in the conditional print settings 410 of a JDF JobTicket 407.

That is, the settings are obfuscated such that gloss paper is used if the value of the key "fneoan" is "efaij" and saddle-stitching is applied if the value of the key "ofazc" is "pp1230".

Following this obfuscation, the metadata 409 of the document for the recipient F that matches a condition is also obfuscated by replacing the original key and value, so that the value "efaij" is paired with the key "fneoan". Also, the metadata 408 of the document for the recipient E that matches a condition is also obfuscated by replacing the original key and value so that the value "pp1230" is paired with the key "ofazc". Furthermore, metadata that is not referred to from the MetadataMap is deleted from the metadata 408 of the document for the recipient E, and the metadata 409 of the document for the recipient F. That is, the key "gender" included in the metadata 408, the key "age" included in the metadata 409, and their respective values are deleted.

As a result of performing the above-mentioned obfuscation processing, the same print settings as FIG. 4A are applied, without the contents of the original metadata that is referred to at least for print settings being revealed to a third party. That is, the document for the recipient F is printed using gloss paper, and the document for the recipient E is saddle-stitched.

The above processing for obfuscating the PDF/VT document and the JDF JobTicket will be described using the flowchart shown in FIG. 5. Note that the flowcharts of the present application are realized by the CPU 301 reading out and executing programs related to the respective flowcharts.

In S501, the JDF JobTicket received from the client PC 102 by the CPU 301 of the print server 104 is read into the RAM 302. In S502, the PDF/VT document received from the client PC 102 by the CPU 301 is read into the RAM 302.

Next, in S503, the CPU 301 obfuscates the MetadataMap in the JDF JobTicket and the metadata in the PDF/VT document. Note that the details of this obfuscation processing will be discussed later using FIGS. 6 to 15.

In S504, the CPU 301 then writes the JDF JobTicket obfuscated in S503 to the HDD 304 of the print server 104. In S505, the CPU 301 writes the PDF/VT document obfuscated in S503 to the HDD 304 of the print server 104.

Details of Obfuscation Processing

Here, the details of the obfuscation processing will be described using FIGS. 6 to 15. Before describing the details of the processing shown in FIG. 6, a description of the data structure of the tree memory for storing obfuscated metadata will be given using FIGS. 7A and 7B. This data structure is hereinafter called an "obfuscated metadata storage tree".

In the processing shown in FIG. 6, metadata after obfuscation has been performed is stored in an obfuscated metadata storage tree. After deleting the original metadata (metadata containing personal information) described in the PDF/VT document, the obfuscated metadata stored in the obfuscated metadata storage tree is reflected in the PDF/VT document.

Figure 7A:
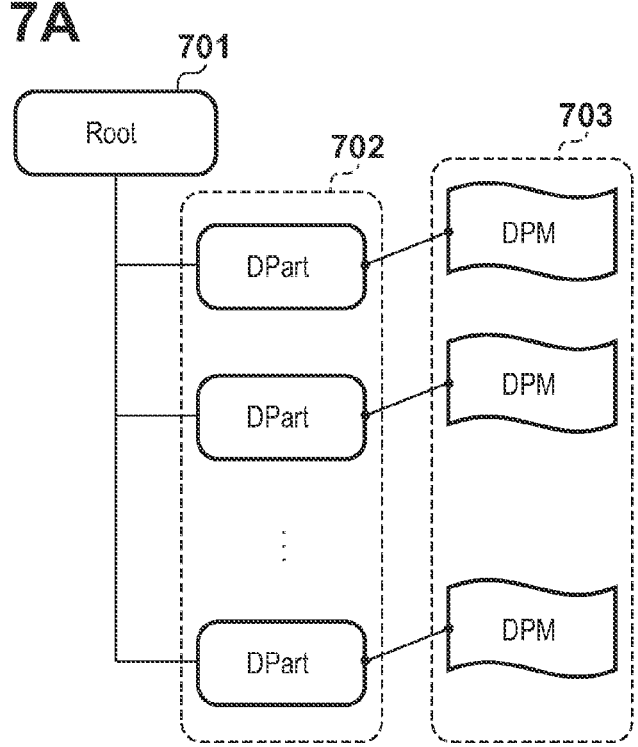
FIG. 7A is a diagram showing a DPart hierarchical structure of a PDF/VT document targeted for processing.
Figure 7B:
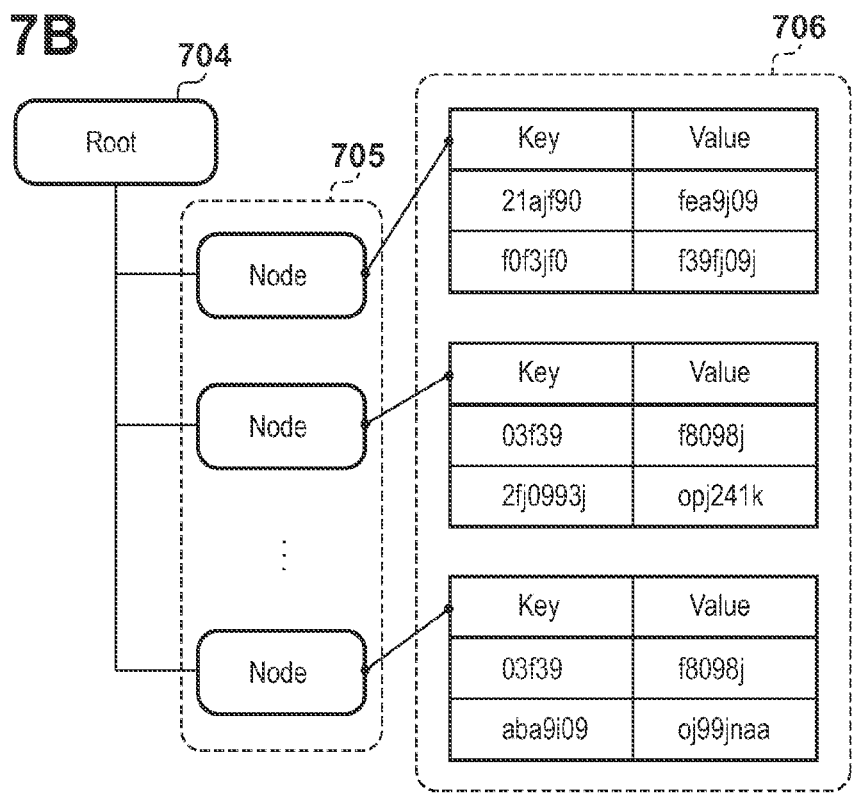
FIG. 7B is a conceptual diagram showing a data structure of an obfuscated metadata storage tree corresponding to the PDF/VT document.

FIGS. 7A and 7B are conceptual diagrams respectively showing the DPart hierarchical structure of a PDF/VT document targeted for processing, and the data structure of an obfuscated metadata storage tree corresponding to the PDF/VT document.

As shown in FIG. 7A, there is a DPart 702 for every recipient under a Root element 701, and DPM (metadata) 703 is described by each DPart. On the other hand, the obfuscated metadata storage tree in FIG. 7B has a similar structure to the DPart of the targeted PDF/VT document. In other words, there is a Node 705 for every recipient under the Root element 704, and obfuscated metadata 706 is stored in each Node. The obfuscated metadata 706 corresponds to the DPM (metadata) 703 of the PDF/VT document.

Next, examples of the JDF JobTicket and the PDF/VT document that will be used when describing the details of the obfuscation processing are shown in FIGS. 8A and 8B. In this JDF JobTicket 801, settings are described such that gloss paper is used if the value of the key "Gender" is "Female", and matte paper is used if the value of the key "Gender" is "Male".

Here, the specifications of the MetadataMap element described in the JDF JobTicket will be briefly described. The JDF JobTicket 801 has a MetadataMap element, and has a comparison operator 803 as a child element of the MetadataMap element. Here, an element called a NameEvaluation is described as the comparison operator 803. The NameEvaluation element is one of the elements representing a comparison operator. The NameEvaluation element has a Path attribute and a ValueList attribute, and if the metadata key in the PDF/VT document designated by the Path attribute is included in the value of the ValueList attribute, the comparison operator is evaluated as true. In this example, the Path attribute is described so as to refer to ¥the key "Gender" of the PDF/VT document, and if the value of the key "Gender" is "Female", this comparison operator 803 will be evaluated as true.

In the case where the comparison operator 803 is evaluated as true, the value of the Name attribute of an Expr element, which is the parent element of the comparison operator 803, is regarded as a variable, and the value of the Value attribute is substituted for that variable. In this example, the value "Pattern1" is substituted for the variable "valtem". On the other hand, similarly, with the following comparison operator (2nd NameEvaluation element), if the value of the key "Gender" is "Male", "Pattern2" is substituted for the variable "valtem".

Settings are configured such that gloss paper is used if the place where paper type is "Pattern1" and matte paper is used if "Pattern2". Settings configured to use gloss paper if the value of the key "Gender" of metadata is "Female" and to use matte paper if the value of the key "Gender" is "Male" are thereby realized.

The DPart hierarchical structure is described in the PDF/VT document 802. Note that although the PDF/VT document 802 is actually written in accordance with PDF grammar, here the PDF/VT document 802 is represented as equivalent XML in accordance with the PDF/VT specification for the sake of readability.

The DParts corresponding to the documents for three recipients are defined in the PDF/VT document 802. Metadata having the keys Gender, Age and Name is described in each of the DParts.

The following keys and values are described in the metadata of the first recipient.
Gender="Male"
Age="21"
Name="Tanaka"
The following keys and values are described in the metadata of the second recipient.
Gender="Female"
Age="52"
Name="Sato"
The following keys and values are described in the metadata of the third recipient.
Gender="Female"
Age="73"
Name="Suzuki"

Here, when the printer controller 105 interprets the JDF JobTicket 801 and the PDF/VT document 802, printing will be performed with matte paper for the first recipient and with gloss paper for the second and third recipients.

Next, the details of the obfuscation processing will be described using FIG. 6. First, in S601, the CPU 301 tracks back through the JDF JobTicket, moves to the first element included in the MetadataMap element, and takes that element as an element targeted for processing. Next, in S602, the CPU 301 initializes the obfuscated metadata storage tree of FIG. 7B. Here, an obfuscated metadata storage tree in which there is no metadata 706 is created, based on the DParts of the PDF/VT document read into the RAM 302. This obfuscated metadata storage tree is stored in the RAM 302 of the print server 104.

Next, in S603, the CPU 301 determines whether the targeted element is a comparison operator. In the JDF JobTicket, different comparison operators are provided for every type of metadata for comparison. For example, an element "IntegerEvaluation" is used in the case of wanting to compare the values of metadata as integers. In the example in FIG. 8A, the element 803 is a "NameEvaluation" comparison operator, and this operator is used in the case of comparing the values of metadata as names.

If a result of the determination at S603 is Yes (if the targeted element is a comparison operator), the processing advances to S604. On the other hand, if No (if not a comparison operator), the processing advances to S608. At S604, the CPU 301 analyzes the contents of the PDF/VT document and locates metadata in the PDF/VT document that matches the comparison operator.

In the JDF JobTicket, metadata for comparison is described as the Path attribute of the comparison operator. This Path attribute is written in XML path language (XPath) format. Also, the key of which metadata to refer to is determined by the description of the Path attribute, as the parent element of the element representing the comparison operator at the level of the PDF/VT document.

Also, in the JDF JobTicket, an attribute for representing a comparative conditional expression is provided. For example, if the value of the metadata that is referred to is a perfect match with the value specified as the attribute value in the case where a ValueList attribute is described, the comparison operator is evaluated as true.

In FIGS. 8A and 8B, the Path attribute of the element 803 is described so as to refer to the key "Gender" that is added to "DPart/DPM/KEY" at the level of the PDF/VT document. Thus, it is tracked back to the key "Gender" of the PDF/VT document at that level. In the example in FIGS. 8A and 8B, it is evaluated whether the keys "Gender" 804, 805 and 806, which are the metadata for evaluation, respectively match the element 803. Since the comparison operator is described so as to evaluate whether "Female" is included, in this example it is evaluated that the metadata 805 and 806 match.

Next, in S605, the CPU 301 changes the element 803, which is a comparison operator, to a StringEvaluation element. A StringEvaluation element is an element for comparing the values of metadata, with the values regarded as character strings. Although the element representing a comparison operator is changed to a StringEvaluation element in this example, the present invention is not limited thereto, and any element representing a comparison operator that is capable of comparing the values of metadata by perfectly matching character strings may be used.

Next, in S606, the CPU 301 changes the value of the Path attribute and the value of the ValueList attribute of the StringEvaluation element changed at S605 to character strings that prevent original character strings from being discriminated. Here, these values are changed to unique character strings per job (pair of a PDF/VT document and a JDF JobTicket). This processing is to ensure that the values do not match metadata that they are not originally supposed to match, after the character strings have been changed.

As for the method of changing character strings, a character string may be changed to a random character string, for example, and the uniqueness of the random character string within the job may be checked. Also, a random character string may be attached to the original character string, and the resultant character string may be changed to a GUID generated from that character string. Alternatively, the first character string changed after starting processing may be changed to a character string such as "UniqueStr0000", and subsequent character strings may be changed to consecutively numbered character strings such as "UniqueStr0001" by incrementing the last digit.

Here, the JDF JobTicket after changing the value of the Path attribute and the value of the ValueList attribute for the comparison operator is shown in FIG. 9. In this comparison operator 901, "Gender", which is the value of the Path attribute, has been changed to a character string "03f39", and "Female", which is the value of the ValueList attribute, has been changed to a character string "f8098j". Note that since the character strings are changed at S606 to character strings that are unique within the one job, the character strings after replacement will not necessarily be the same between different jobs, even if metadata having the same key is processed.

Next, in S607, the CPU 301 adds the key and the value after the character string change (after obfuscation) to the nodes of the obfuscated metadata storage tree corresponding to the metadata located in S604. In the example in FIGS. 8A and 8B, the metadata 805 and 806 match the comparison operator 803 as mentioned above. In view of this, the key and the value that were changed at S606 are stored in the nodes corresponding to the metadata 805 and 806 in the obfuscated metadata storage tree.

The state where the key and the value after obfuscation are stored in the nodes corresponding to the metadata 805 and 806 in this obfuscated metadata storage tree is shown in FIG. 10. As shown in FIG. 10, the key "03f39" and the value "f8098j" of the key that were changed at S606 are respectively stored in keys and values 1001.

On the other hand, at S608, the CPU 301 determines whether a following element targeted for processing exists in the MetadataMap. If the determination result indicates that a following element targeted for processing does exist, the processing advances to S609, but if a following element targeted for processing does not exist, the processing advances to S610. In S609, the CPU 301 moves the processing to the following element in the MetadataMap.

Up to this point the flow of processing has been described, focusing on the first comparison operator in the MetadataMap described in FIG. 8A. Before describing S610, a description of the flow of processing will be given with regard to another comparison operator. A JDF for which processing of the first comparison operator in this MetadataMap has been completed is shown in FIG. 11. As shown in FIG. 11, another comparison operator 1101 exists in this MetadataMap. The comparison operator 1101 refers to the key "Gender" of the PDF/VT, and is evaluated as true if the value is "Male". Here, when the processing of S604 is performed in relation to the comparison operator 1101, the metadata 804 having the value "Male" matches the comparison operator 1101 among the metadata 804, 805 and 806 in FIG. 8B.

Next, in S605 in relation to the comparison operator 1101, the comparison operator 1201 is changed to a StringEvaluation as shown in FIG. 12. Then, in S606, "Gender", which is the value of a Path attribute, is changed to a character string "21ajf90", and "Male", which is the value of the ValueList attribute is changed to a character string "fea9j09".

Figure 13:
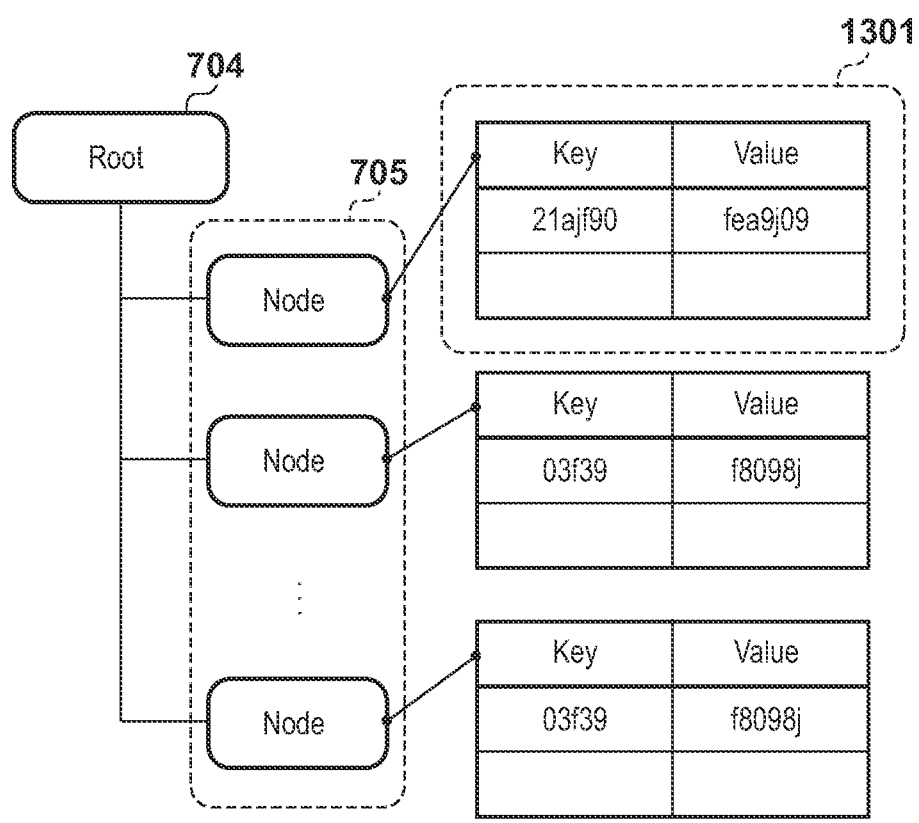
FIG. 13 is a diagram showing a state in which keys and values after obfuscation are stored.

Subsequently, in S607, the key and the value after the character string change are stored in the node corresponding to the metadata 804 that matched the comparison operator 1101 in FIG. 11, among the nodes of the obfuscated metadata storage tree. The state where the key and the value after obfuscation are stored in the node corresponding to the metadata 804 in this obfuscated metadata storage tree is shown in FIG. 13. As shown in FIG. 13, the key "21ajf90" and the value "fea9j09" that were changed at S606 are stored in a key and a value 1301 of the node.

As a result of the processing up to this point, processing on the comparison operators included in the MetadataMap is completed. Hereinafter, the processing from S610 onward will be described.

In S610, the CPU 301 deletes the metadata of the PDF/VT document. The metadata 1401, 1402 and 1403 included in the PDF/VT document shown in FIG. 14 are deleted by this processing. Next, in S611, the CPU 301 adds the metadata after obfuscation to the PDF/VT document, based on the obfuscated metadata storage tree created by the processing up to S609. The PDF/VT document processed at the abovementioned S610 and S611 in relation to FIG. 14 is shown in FIG. 15. As shown in FIG. 15, metadata after obfuscation that is stored in the obfuscated metadata storage tree shown in FIG. 13 is added as metadata 1501, 1502 and 1503 of a PDF/VT document.

As mentioned above, metadata embedded in a VDP document (PDF/VT document in the present embodiment) can be obfuscated, without changing the print setting result applied to each recipient.

As a result, since it is not necessary to restore the replaced metadata at any point during the printing, there is no risk of personal information being viewed at any point during the printing.

Also, since decryption processing is unnecessary, a special apparatus for decryption does not need to be provided, and printing can be executed without causing a decrease in performance. Furthermore, since irreversible obfuscation is performed, it can be expected to achieve a higher level of security than encryption which risks being deciphered.

Overview of Variation in Obfuscation Processing

In the abovementioned obfuscation processing, obfuscation is performed in relation to all metadata included in a VDP document. However, when using JDF JobTickets, it may be the case that a barcode for printed matter inspection is automatically generated from the value of metadata (recipient's ID, etc.) embedded in a VDP document. In view of this, direct use of the values of metadata in a VDP document by a JDF JobTicket will be expressed hereinafter as "directly referring to metadata" for descriptive purposes.

In the case where an element that directly refers to metadata is described in the JDF JobTicket, there is a problem in that the correct barcode is not generated when the values of metadata included in the VDP document are changed to random character strings.

In view of this, in this variation, a function of presenting a UI (user interface) such as shown in FIG. 19 to the user, and allowing the user to select metadata for obfuscation is provided. Furthermore, an additional function of identifying whether an element that directly refers to metadata is described in the JDF JobTicket and making the user aware this metadata should not be targeted for obfuscation is provided.

Details of Variation in Obfuscation Processing

Next, the details of the variation in the obfuscation processing will be described using FIGS. 16A to 18. Before describing the flowchart shown in FIGS. 16A and 16B, a description of FIGS. 17 and 18 which are required in the description of FIGS. 16A and 16B will be given first.

FIG. 17 is a diagram showing the data structure of a map of metadata and elements in a JDF JobTicket that directly refers to the metadata. Hereafter, this map will be called a "metadata usage map". As shown in FIG. 17, metadata keys 1701 are stored in the metadata usage map. The metadata keys 1701 are stored with XPath expressions, so as to express the locations of the metadata in the hierarchy of the PDF/VT document. Information indicating, for each metadata key 1701, which of the elements in the JDF JobTicket the key is used by is associated with direct-using elements 1702.

In this example, a "CustomerID" key that is added to the level "/DPart/DPM/KEY" of the metadata is shown as being used by a DynamicField element in the JDF JobTicket. Note that the DynamicField element is an element for dynamically generating a barcode, for example, from the value of the metadata that is referred to directly.

Figure 18:
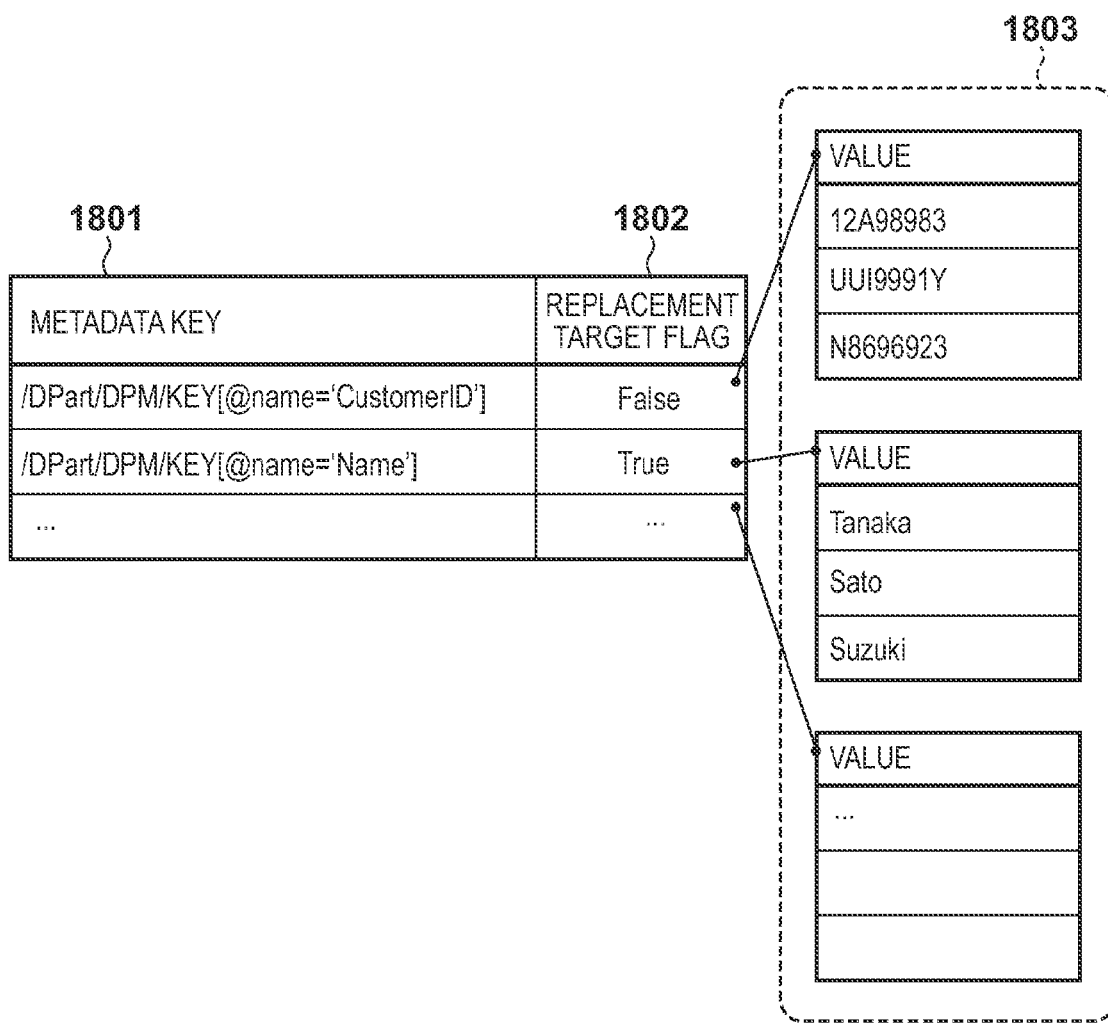
FIG. 18 is a diagram showing the data structure of keys and values included in a PDF/VT document targeted for processing.

Next, the data structure of keys and values included in a PDF/VT document targeted for processing is represented in FIG. 18. Hereinafter, the map of this data structure is called a "key/value map". The key/value map includes the keys 1801 of metadata included in a PDF/VT document and replacement target flags 1802 indicating, for each metadata, whether the metadata is to be replaced. Here, the replacement target flags 1802 take the values true or false. In this key/value map, the values corresponding to the respective keys are associated as a list 1803. Also, the key/value map is stored in the RAM 302 provided in the print server 104. A UI such as shown in FIG. 19 is displayed to the user, based on this key/value map and the metadata usage map (FIG. 17).

Figure 16A:
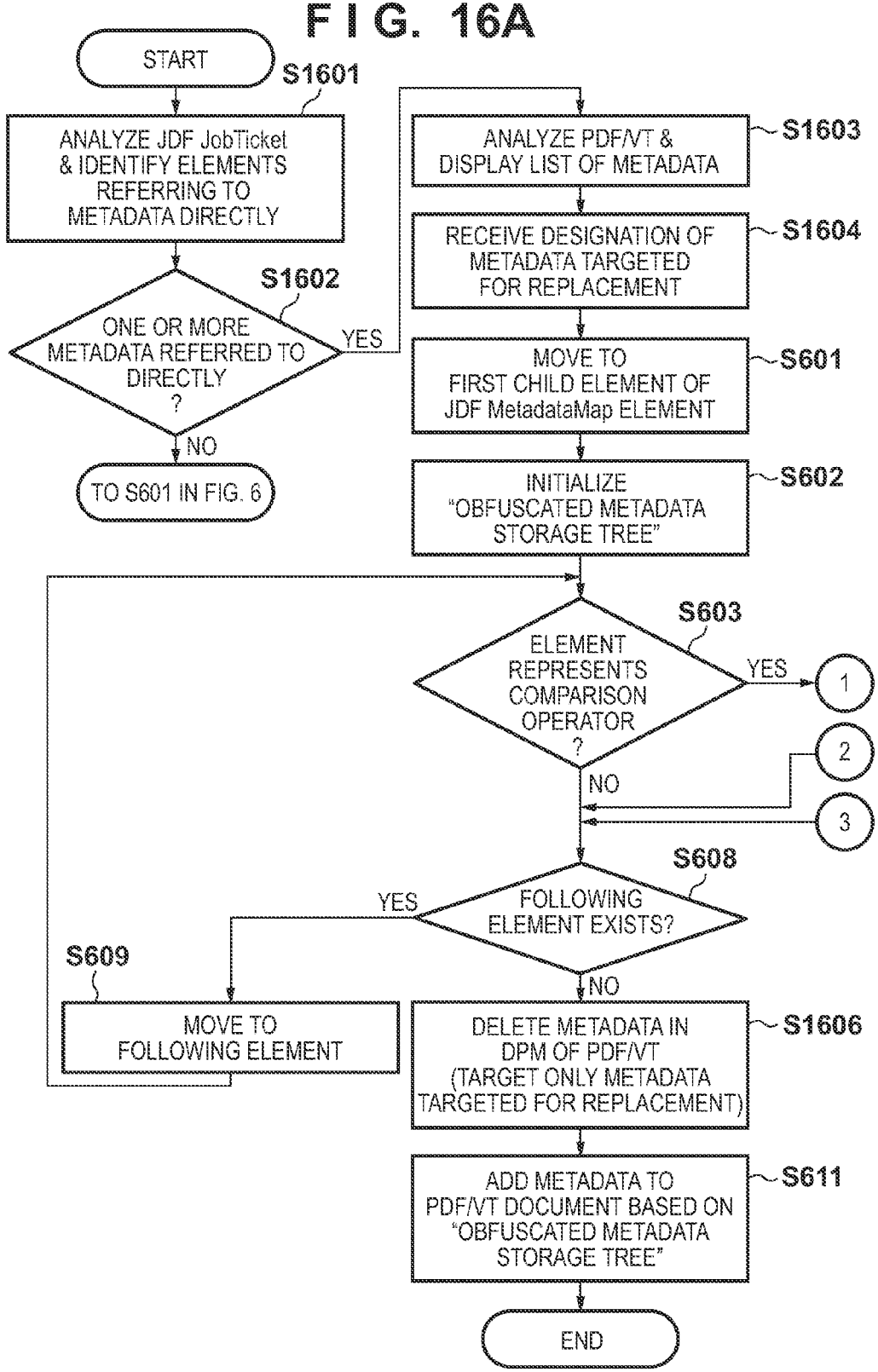

Here, the details of the variation in obfuscation processing will be described using the flowchart shown in FIGS. 16A and 16B. A PDF/VT document is also used as an exemplary VDP document in relation to this variation, similarly to the abovementioned obfuscation processing. Note that since the processing of S601 to S609 and S611 shown in FIGS. 16A and 16B is similar to FIG. 6, description will be omitted here. Also, description is omitted in relation to input-output processing of PDF/VT documents and JDF JobTickets because of the similarity with FIG. 5.

In S1601, the CPU 301 analyzes the contents of the JDF JobTicket and identifies elements that directly refer to metadata. The detailed processing of S1601 will be discussed later using FIGS. 20, 21A and 21B. The metadata usage map shown in FIG. 17 is created, as a result of an element that directly refers to metadata having been identified. The metadata usage map is stored in the RAM 302 provided in the print server 104.

Next, in S1602, the CPU 301 determines whether there are one or more metadata that are directly referred to from the JDF JobTicket. Specifically, if one or more metadata key are stored in the metadata keys 1701 of the metadata usage map created in S1601, the determination result will be Yes and the processing advances to S1603.

On the other hand, if no metadata keys are stored in the metadata keys 1701 of the metadata usage map, the determination result will be No and processing advances to S601 in FIG. 6. In other words, in the case where there is no metadata that is referred to directly by the JDF JobTicket, processing similar to the abovementioned obfuscation processing can be performed, because the result of the print settings will be not be affected even if all of the metadata is obfuscated. In the case where there is no metadata that is referred to directly by the JDF JobTicket, the user can thereby be saved the time and effort involved in designating metadata for obfuscation. Note that in the case where the user wants to always check the metadata for obfuscation, a configuration may be adopted in which, instead of performing the processing of S1602, the processing always advances to S1603.

In this S1603, the CPU 301 analyzes the PDF/VT document, and displays a UI for allowing the user to select metadata for obfuscation. The detailed processing of S1603 will be discussed later using FIG. 22. Also, the details of the UI will be discussed later using FIG. 19.

Next, in S1604, the CPU 301 receives designation of metadata for obfuscation from the user through the UI displayed at S1603. The value "true" is stored in the replacement target flags 1802 of the key/value map shown in FIG. 18, in relation to metadata that the user has designated as being for obfuscation. On the other hand, the value "false" is stored in the replacement target flags 1802, in relation to metadata that is designated as not being for obfuscation.

Next, the abovementioned obfuscation processing (S601 to S603) is performed, and when the processing advances to S1605, the CPU 301 determines whether the metadata referred to by the comparison operator for processing is to be replaced. The determination method involves searching for a key that matches the value of the Path attribute included in the comparison operator, among the metadata keys 1801 of the key/value map shown in FIG. 18. If the replacement target flag 1802 corresponding to that key is true, it is determined that the metadata is to be replaced, and the processing advances to S604. Also, if the replacement target flag 1802 is false, it is determined that the metadata is not to be replaced, and the processing advances to S608. If it is determined by this determination processing that the metadata referred to by the comparison operator for processing is to be replaced, the conditional expression of the comparison operator is obfuscated by the processing of S604 to S607. On the other hand, if the metadata referred to by the comparison operator for processing is not to be replaced, the conditional expression of the comparison operator remains unchanged.

Thereafter, when the processing advances from S608 to S1606, the CPU 301 deletes only the metadata targeted for obfuscation out of the metadata in the PDF/VT document. The replacement target flags 1802 of the key/value map shown in FIG. 18 are referred to in relation to each metadata, and if metadata referred to by the comparison operator is an obfuscation target (true), that metadata is deleted from the PDF/VT document. On the other hand, if not an obfuscation target, that metadata is kept and not deleted.

As a result of the above processing, metadata that is designated by the user as "being for obfuscation" is obfuscated. The conditional expression of the comparison operator in the JDF JobTicket that refers to that metadata is also obfuscated. On the other hand, metadata that is designated by the user as "not being for obfuscation" can remain in PDF/VT document without being obfuscated. The conditional expression of the comparison operator that refers to that metadata can also remain in the JDF JobTicket without being obfuscated.

UI for Designating Replacement Target

Here, a UI for designating replacement targets will be described using FIG. 19. In FIG. 19, a text box 1901 is for receiving designation of the paths of input files and an output folder from the user. A VDP document (PDF/VT document in this example) and a JDF JobTicket that are to be targeted for replacement are designated as inputs. Also, a folder path for outputting the VDP document and the JDF JobTicket that have undergone replacement is designated, as an output.

Buttons 1902 are for allowing the user to designate the paths of the input files and the output folder that are designated in text boxes 1901 from the folder tree of the file system. When the buttons 1902 are pressed here, the folder tree is displayed to the user, allowing the user to designate the input files and the output folder. The designated paths are displayed in the text boxes 1901.

A table 1903 expresses, for each metadata included in the input VDP document designated in the text box 1901, a key, exemplary values, whether the metadata is referred to directly, and whether the metadata is a replacement target. The table 1903 is displayed by reading the input VDP document and job ticket that are designated in the text boxes 1901. Display processing will be discussed later using FIG. 22.

In the table 1903, the keys of the metadata included in the input VDP document are displayed in a list field 1904. Here, the key names of metadata are directly displayed as key names, but a configuration may be adopted in which the locations of the metadata in the document hierarchy of the PDF/VT document are displaced in XPath format.

All or some of the values for the keys displayed in the list field 1904 are displayed in the next field 1905. By looking at this field 1905, the user is able to check what kinds of values are stored for each key.

A field 1906 for making the user aware as to whether the value of each key displayed in the list field 1904 is referred to directly by the JDF JobTicket is displayed. By looking at this field 1906, the user is able to check whether each key is referred to directly by the JDF JobTicket (i.e., whether print settings will be affected if the key is obfuscated).

Specifically, if the key is among the metadata keys 1701 in the metadata usage map shown in FIG. 17, "Yes" indicating that the metadata is referred to directly will be displayed in the field 1906. Furthermore, the direct-using elements are displayed in list form with reference to the direct-using elements 1702. In the example shown in FIG. 19, the value of the CustomerID key is shown as being directly used by the DynamicField element of the JDF JobTicket. Also, if the key is not among the metadata keys 1701, "No" indicating that the metadata is not referred to directly is displayed in the field 1906.

A check box 1907 is for allowing the user to designate which metadata to target for obfuscation. If this check box 1907 is checked, the metadata is regarded as being targeted, and if unchecked, the metadata is regarded as not being targeted. The operation for checking and unchecking this check box 1907 corresponds to the processing of S1604 shown in FIG. 16A.

In default display at the point in time at which the UI shown in FIG. 19 is opened, the check box 1907 is displayed in the unchecked state, in relation to keys with respect to which "Yes" indicating that the metadata is referred to directly is displayed in the field 1906. Similarly, the check box 1907 is displayed in the checked state, in relation to keys with respect to which "No" indicating that the metadata is not referred to directly is displayed in the field 1906. The user is thereby saved the time and effort involved in checking and unchecking the check box 1907. Default display of the check box 1907 will be discussed later using FIG. 22.

Figure 23:
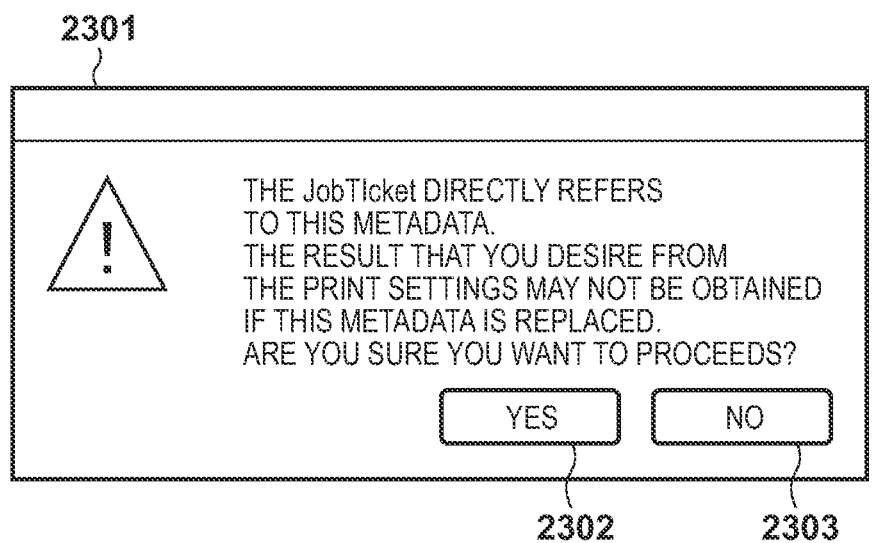
FIG. 23 is a diagram showing an example of a warning dialog 2301.

Note that a configuration may be adopted such that in the case where the user checks the check box 1907 for a key with respect to which "Yes" indicating that the metadata is referred to directly is displayed in the field 1906, a warning dialog such as shown in FIG. 23 is displayed to the user.

FIG. 23 is a diagram showing an example of a warning dialog 2301. As shown in this example, a message is displayed for making the user aware that the result that he or she desires from the print settings may not be obtained if obfuscation is performed. A button 2302 is for designating the metadata as a replacement target, and if the button 2302 is pushed, the check box 1907 is checked. Also, a button 2303 is for canceling the operation for designating the metadata as a replacement target, and if the button 2303 is pressed, the check box 1907 remains unchecked.

Alternatively, instead of displaying a warning dialog, a configuration may be adopted in which the user is made aware by, for instance, displaying in red the line corresponding to the metadata, among the lines in the table 1903 shown in FIG. 19.

Returning to FIG. 19, a button 1908 is for checking the check boxes 1907 for all metadata keys. Note that a configuration may be adopted in which a warning dialog is displayed to the user, in the case where the button 1908 is pressed when one or more metadata with respect to which "Yes" indicating that the metadata is referred to directly are included in the field 1906. Specifically, a configuration may be adopted in which a warning dialog is displayed indicating that "One or more metadata are referred to directly. Are you sure you want to obfuscate all of the metadata?".

Also, a button 1909 is for unchecking the check boxes 1907 of all metadata keys. Furthermore, a button 1910 is for starting the obfuscation processing. The processing of S601 shown in FIG. 16A is then started by pressing the button 1910. A button 1911 is for closing this UI without performing replacement.

Identification of Metadata Referred to Directly

Figure 20:
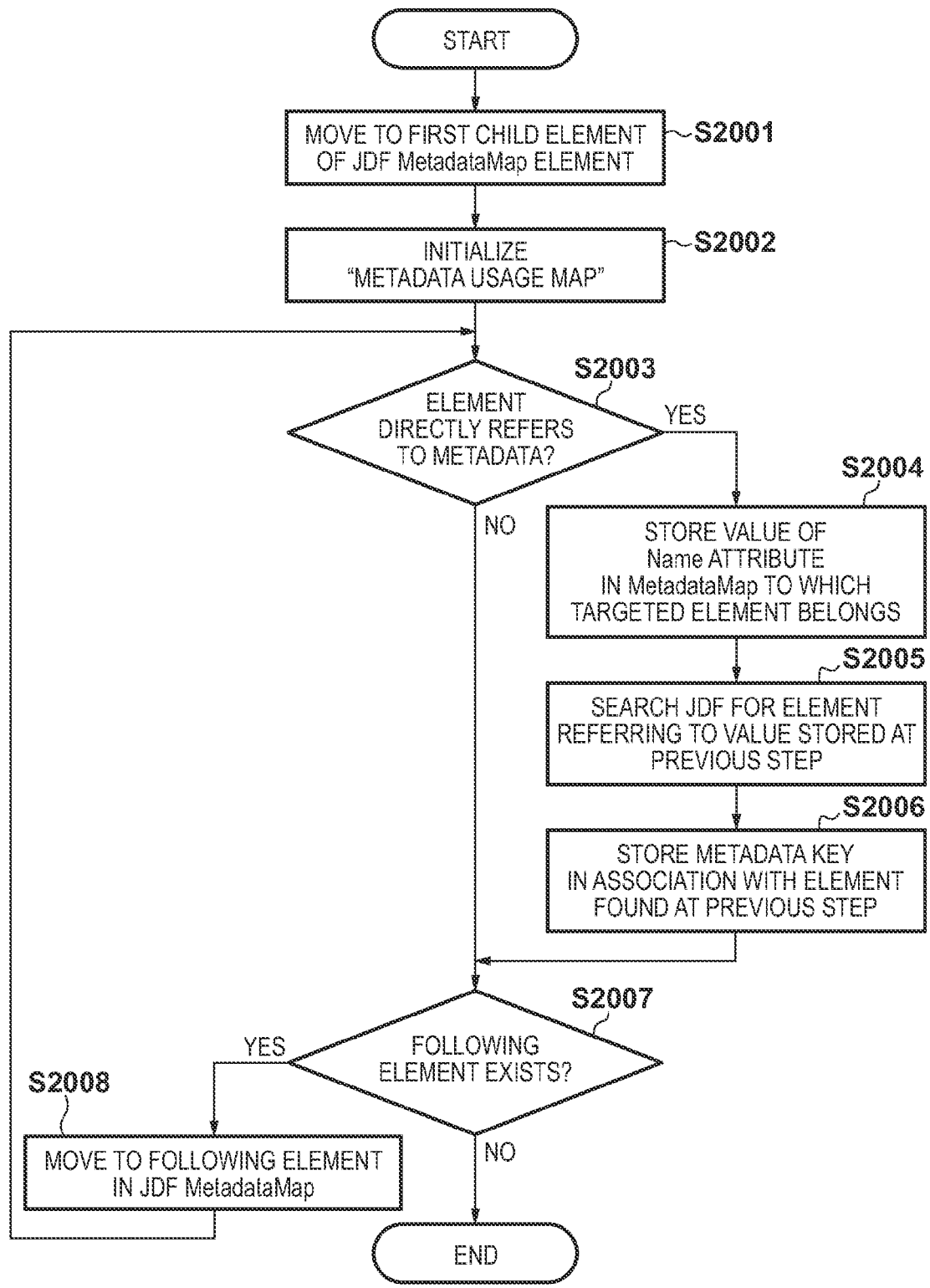
FIG. 20 is a flowchart showing the detailed processing of S1601.

Here, the detailed processing of S1601 will be described using FIGS. 20, 21A and 21B. FIG. 20 is a flowchart showing the details of processing for analyzing the JDF JobTicket and identifying metadata that is referred to directly. A "metadata usage map" is generated by this processing. That is, it becomes possible to discriminate the relationship as to which metadata is used by which element of the JDF.

FIG. 21A is a diagram showing an example of the script of a JDF JobTicket in the case where the MetadataMap directly uses metadata included in a PDF/VT document, and FIG. 21B is a diagram showing an example of the script of a PDF/VT document. Hereinafter, the processing shown in FIG. 20 will be described using the example of the script 2101 of a JDF JobTicket and the script 2102 of a PDF/VT document.

First, in S2001, the CPU 301 tracks back through the JDF JobTicket, and moves to the first element included in the MetadataMap element. In S2002, the CPU 301 then initializes the metadata usage map. As mentioned above, the metadata usage map is a map of metadata and elements in JDF that use the metadata, such as shown in FIG. 17. Note that initialization processing is processing for deleting data stored in the keys 1701 of the metadata in the metadata usage map and the direct-using elements 1702.

Next, in S2003, the CPU 301 determines whether the targeted element is an element that directly refers to metadata. In the JDF JobTicket, an Expr element that does not have a child element is an element that directly refers to metadata. An element 2103 shown in FIG. 21A corresponds to an element that directly refers to metadata. Note that this element 2103 refers to the value of the key "CustomerID" which is metadata of the PDF/VT document shown in FIG. 21B. Also, metadata 2104, 2105 and 2106 correspond to the respective recipients of the PDF/VT document, and are referred by the element 2103.

If the result of the determination at S2003 indicates Yes (if an element that directly refers to metadata), the processing advances to S2004. On the other hand, if No (if not an element that directly refers to metadata), the processing advances to S2007. In S2004, the CPU 301 stores, in the RAM 302 of the print server 104, the value of the Name attribute in the MetadataMap to which the targeted element belongs. In the example in FIG. 21A, the "CustomerID" character string 2107 corresponding to the value of the Name attribute in the MetadataMap to which the targeted element belongs is stored.

Next, in S2005, the CPU 301 scans the JDF JobTicket, and searches for an element referring to "CustomerID" stored at S2004. Note that the search may result in a plurality of elements being found or no elements being found.

In FIG. 21A, an element 2108 is an element that refers to the value stored at S2004. This element 2108 is a DynamicField element, and is an element for dynamically generating character strings and printing the character strings as barcodes, slag lines or the like, using the value (CustomerID) designated by a Template attribute.

Next, in S2006, the CPU 301 stores the key of the metadata referred to by the Expr element in the metadata usage map in association with the element retrieved at S2005. First, the key of the metadata referred to by the Expr element (i.e., value of Path attribute of Expr element) is stored in the metadata key 1701. In the example shown in FIG. 17, the key "/DPart/DPM/KEY [@name='CustomerID']" is stored.

In the present embodiment, the description position of the metadata in the PDF/VT document is described in XPath format. Note that the key is not stored in the case where the same key is already stored in the metadata key 1701, as it is redundant. Also, the metadata key is not stored in the metadata key 1701 in the case where an element is not retrieved at S2005.

Next, the CPU 301 stores the element retrieved at S2005 in the direct-using element 1702 corresponding to the entry in which the metadata key is stored. In the case where a plurality of elements are found at S2005, a plurality of element names are stored. "DynamicField" is stored in the direct-using element 1702 in the example in FIG. 17.

Next, in S2007, the CPU 301 determines whether a following element targeted for processing exists in the elements below the MetadataMap element. If a result of determination indicates Yes (following processing target does exist), the processing advances to S2008, and if No (following processing does not exist), this processing is ended. On the other hand, in S2008, the CPU 301 moves the processing to the following element below the MetadataMap element.

The "metadata usage map" is completed as a result of the processing of S2001 to S2008. The CPU 301 is now able to discriminate which metadata is used by which element of the JDF JobTicket by referring to the metadata usage map.

Details of UI Display Processing

Here, the details of the UI display processing (S1603) will be described using FIG. 22. The table 1903 of UI shown in FIG. 19 is displayed as a result of this processing.

First, in S2201, the CPU 301 initializes the key/value map shown in FIG. 18. This initialization is processing for deleting the contents of the metadata keys 1801, the replacement target flags 1802, and the values 1803 shown in FIG. 18.

Next, in S2202, the CPU 301 analyzes the PDF/VT document and stores the keys and values of metadata included in this PDF/VT document in the key/value map. Specifically, the keys included in the PDF/VT document are stored in the metadata keys 1801. Specifically, the locations of the keys are stored in XPath format. The values corresponding to the keys are stored in the values 1803. Note that true is stored in the replacement target flags 1802 for all of the keys.

Next, in S2203, the CPU 301 sets the first key in the key/value map (i.e., entry at the top of the metadata keys 1801 shown in FIG. 18) as the processing target. In S2204, the CPU 301 determines whether the targeted key exists among the metadata keys 1701 in the "metadata usage map" shown in FIG. 17. This processing, in other words, involves determining whether the targeted key is referred to directly by MetadataMap of the JDF JobTicket. If the determination result indicates Yes (if the targeted key does exist in the metadata usage map), the processing advances to S2205. On the other hand, if No (if the targeted key does not exist in the metadata usage map), the processing advances to S2206.

In the example shown in FIGS. 17 and 18, "/DPart/DPM/KEY [@name='CustomerID']", which is the first key of the key/value map exists in the metadata usage map. In other words, since the key is referred to directly by the MetadataMap, the processing advances to S2205. In S2205, the CPU 301 unchecks the check box 1907 of the UI shown in FIG. 19, and changes into the replacement target flag 1802 shown in FIG. 18 to false. When the UI shown in FIG. 19 is opened, the check box will thereby be in an unchecked state in default display.

In contrast, in S2206, the CPU 301 checks the check box 1907 of the UI shown in FIG. 19, and changes the replacement target flag 1802 shown in FIG. 18 to true. When the UI shown in FIG. 19 is opened, the check box will thereby be in a checked state in default display.

In S2207, the CPU 301 then displays the key and the value in the table 1903 of the UI shown in FIG. 19, in relation to the targeted key. Key names are displayed in the list field 1904 based on the metadata keys 1801 in the "key/value map". A list of values corresponding to the keys is displayed in the next field 1905 based on the values 1803 of the "key/value map". A list of usage element in the JDF JobTicket is displayed in the field 1906, based on the direct-using elements 1702 of the "metadata usage map".

Although lists are shown in the fields 1905 and 1906 in the example in FIG. 19, a configuration may be adopted in which the lists are displayed in a separate dialog in the case where the fields 1905 and 1906 are double-clicked, thereby enhancing visibility.

Next, in S2208, the CPU 301 determines whether a following key targeted for processing exists in the key/value map. If the determination result indicates Yes (if a following processing target does exist), the processing advances to S2209, but if No (if a following processing target does not exist) this processing is terminated. On the other hand, in S2209, the processing is moved to the following element in the key/value map.

The UI shown in FIG. 19 is presented to the user as a result of the abovementioned UI display processing. It is possible to obfuscate only metadata desired by the user, by then receiving designations from the user as to which metadata to obfuscate, through the check boxes 1907. As a result, it is possible to check whether metadata will affects the contents to be printed as a result of being obfuscated, before designating the metadata as an obfuscation target.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such variations and equivalent structures and functions.

This application claims the benefit of Japanese Patent Application No. 2012-090452 filed Apr. 11, 2012, which is hereby incorporated by reference herein in its entirety.

What is claimed is:

1. An information processing apparatus comprising:
   at least one processor; and
   at least one memory comprising computer code, the at least one memory and the computer code configured to, with the at least one processor, cause the apparatus at least to:
   receive a document for variable printing and a job ticket including print settings, the print settings including a conditional print setting that depends on metadata included in the document;
   replace, in the received document, information that is common between the conditional print setting and metadata included in the document with unique information, replace in the received lob ticket, a condition portion of the conditional print setting with the unique information, and delete, in the received document, information that is not common between the conditional print setting and metadata included in the document such that the deleted information is removed from the received document; and
   instruct printing, using the conditional print setting and the document in which the common information is replaced with the unique information.

2. The information processing apparatus according to claim 1, wherein the apparatus replaces the common information with the unique information by changing a conditional expression of the conditional print setting to a predetermined character string.

3. The information processing apparatus according to claim 2, wherein the character string includes a random character string.

4. The information processing apparatus according to claim 2, wherein the character string includes a consecutive number that is incremented whenever the character string is changed after processing is started.

5. The information processing apparatus according to claim 1, further comprising a designating unit that allows a user to designate whether to replace the metadata,
wherein the apparatus replaces, in the document, information that is common between the conditional print setting and metadata designated for replacement by the designating unit with unique information.

6. The information processing apparatus according to claim 5, wherein in a case where metadata designated for replacement by the designating unit is directly used in the print settings, the apparatus warns the user that there is a possibility that a print setting result desired by the user will not be obtained if the metadata is replaced by the replacing unit.

7. The information processing apparatus according to claim 1, wherein the apparatus instructs a printer or a printer controller to perform printing.

8. An information processing method that is executed by an information processing apparatus, comprising:
receiving a document for variable printing and a job ticket including print settings, the print settings including a conditional print setting that depends on metadata included in the document;
replacing, in the received document, information that is common between the conditional print setting and metadata included in the document with unique information, replacing in the received job ticket, a condition portion of the conditional print setting with the unique information, and deleting, in the received document, information that is not common between the conditional print setting and metadata included in the document such that the deleted information is removed from the received document; and
instructing printing, using the conditional print setting and the document in which the common information is replaced with the unique information.

9. The processing method according to claim 8, wherein the common information is replaced with the unique information by changing a conditional expression of the conditional print setting to a predetermined character string.

10. The processing method according to claim 8, further comprising allowing a user to designate whether to replace the metadata,
wherein information that is common between the conditional print setting and metadata designated for replacement is replaced in the document with unique information.

11. The processing method according to claim 10, wherein in a case where metadata designated for replacement is directly used in the print settings, the user is warned that there is a possibility that a print setting result desired by the user will not be obtained if the metadata is replaced.

12. A non-transitory computer-readable medium having recorded thereon a program for causing a computer to execute processing for:
receiving a document for variable printing and a job ticket including print settings, the print settings including a conditional print setting that depends on metadata included in the document;
replacing, in the received document, information that is common between the conditional print setting and metadata included in the document with unique information, replacing in the received job ticket, a condition portion of the conditional print setting with the unique information, and deleting, in the received document, information that is not common between the conditional print setting and metadata included in the document such that the deleted information is removed from the received document; and
instructing printing, using the conditional print setting and the document in which the common information is replaced with the unique information.

13. The medium according to claim 12, wherein the common information is replaced with the unique information by changing a conditional expression of the conditional print setting to a predetermined character string.

14. The medium according to claim 13, wherein the program further causes the computer to execute processing for allowing a user to designate whether to replace the metadata,
wherein information that is common between the conditional print setting and metadata designated for replacement is replaced in the document with unique information.

15. The medium according to claim 14, wherein in a case where metadata designated for replacement is directly used in the print settings, the user is warned that there is a possibility that a print setting result desired by the user will not be obtained if the metadata is replaced.

* * * * *